(12) United States Patent
Mitola, III et al.

(10) Patent No.: US 10,111,243 B2
(45) Date of Patent: Oct. 23, 2018

(54) COMPUTERIZED METHODS AND APPARATUS FOR SPECTRUM ACCESS

(71) Applicant: Federated Wireless, Inc., Boston, MA (US)

(72) Inventors: Joseph Mitola, III, Cocoa Beach, FL (US); Johanna Dwyer, Brookline, MA (US); James Neel, Lynchburg, VA (US)

(73) Assignee: FEDERATED WIRELESS, INC., Arlington, VA (US)

( * ) Notice: Subject to any disclaimer, the term of this patent is extended or adjusted under 35 U.S.C. 154(b) by 293 days.

(21) Appl. No.: 14/559,614

(22) Filed: Dec. 3, 2014

(65) Prior Publication Data

US 2015/0245374 A1     Aug. 27, 2015

Related U.S. Application Data

(60) Provisional application No. 62/024,302, filed on Jul. 14, 2014, provisional application No. 61/983,089, filed on Apr. 23, 2014, provisional application No. 61/983,086, filed on Apr. 23, 2014, provisional application No. 61/983,095, filed on Apr. 23, 2014, (Continued)

(51) Int. Cl.
| | |
|---|---|
| *H04W 72/12* | (2009.01) |
| *H04W 74/02* | (2009.01) |
| *H04W 16/14* | (2009.01) |
| *H04W 74/08* | (2009.01) |

(Continued)

(52) U.S. Cl.
CPC ........ *H04W 72/1242* (2013.01); *G06Q 30/08* (2013.01); *H04M 15/8235* (2013.01); *H04W 16/14* (2013.01); *H04W 72/1294* (2013.01); *H04W 74/02* (2013.01); *H04W 72/1247* (2013.01); *H04W 74/08* (2013.01)

(58) Field of Classification Search
CPC combination set(s) only.
See application file for complete search history.

(56) References Cited

U.S. PATENT DOCUMENTS

| | | |
|---|---|---|
| 2003/0069828 A1 | 4/2003 | Blazey et al. |
| 2008/0117869 A1 | 5/2008 | Freen et al. |

(Continued)

FOREIGN PATENT DOCUMENTS

WO     WO-2012126509 A1     9/2012

OTHER PUBLICATIONS

International Search Report and Written Opinion issued by the U.S. Patent and Trademark Office as International Searching Authority for International Application No. PCT/US14/68374 dated Mar. 4, 2015 (14 pgs.).

*Primary Examiner* — Yee Lam
(74) *Attorney, Agent, or Firm* — Finnegan, Henderson, Farabow, Garrett & Dunner, LLP

(57) ABSTRACT

A system and computerized method for controlling access to shared spectrum in which access is prioritized among different classes of devices so that top priority devices have immediate access to the shared spectrum and lower priority devices contend for access. In some embodiments, the system and computerized method comprises managing a set of priority classes of devices to use the shared spectrum and granting rights to one or more of the requesting devices to use a portion of the shared spectrum during a requested use period based on a decision making process.

17 Claims, 21 Drawing Sheets

Related U.S. Application Data provisional application No. 61/983,099, filed on Apr. 23, 2014, provisional application No. 61/911,960, filed on Dec. 4, 2013.

(51) Int. Cl.
*H04M 15/00* (2006.01)
*G06Q 30/08* (2012.01)

(56) References Cited

U.S. PATENT DOCUMENTS

| | | |
|---|---|---|
| 2010/0279653 A1 | 11/2010 | Poltorak |
| 2011/0250915 A1 | 10/2011 | Stanforth et al. |
| 2012/0157144 A1 | 6/2012 | Stanforth et al. |
| 2012/0264396 A1 | 10/2012 | Smith et al. |
| 2014/0080535 A1* | 3/2014 | Gauvreau ............. H04W 16/14 455/513 |
| 2015/0373554 A1* | 12/2015 | Freda ................... H04W 16/14 455/450 |

* cited by examiner

*MNO*
*subprofile*
    *Metrocell*
    *Picocell*
    *Enterprise Femtocell*
    *Femtocell*

Backhaul operator
*Subprofile*
        *Point to point*
        *Point to multipoint*

Enterprise
*Subprofile*
        *Picocell*
        *Enterprise Femtocell*

FIG. 11

Bandwidth Authorization Request

*POST https://FCCSAS.gov:8433/api/spectrum/Allocation*

Authorization: Basic xxxxxxxxxxxxxxxxxxx

Accept:

application/vnd.gov.fcc.sas+json

Body:

"operator": "ATT",

"PAL_ID" : 123456,

"operatorType" : "MNO-microcell"

"location" : {

"gpsCoordinates" : [ 42.3364384, -71.1234961],

"physicalAddress" : "51 Harvard Ave #2, Brookline, MA",

"floor": 3,

}

"deviceCapabilities": {

"frequency" : 3550

"power" : 1000,

}

"leasePeriod" : {

"startDate" : "12/15/2013",

"startTime" : "09:00:00",

"duration" : 36000,

}

}

Potential structure for response message

FIG. 12

*HTTPHTTP/1.1 200 OK*

Content-Type: application/vnd.gov.fcc.sas+json

Content-Length: nnn

{

"frequency" : {

"availableSlots" : [3550, 3560, 3570, 3600, 3610]

Response:

Bandwidth Authorization Response

*HTTP/1.1 200 OK*

Content-Type: application/vnd.gov.fcc.sas+json

Content-Length: nnn

{

"transactionID" : ABC1234567890

Alternate Bandwidth Authorization Response

Bandwidth Authorization Response

*HTTP/1.1 200 OK*

Content-Type: application/vnd.gov.fcc.sas+json

Content-Length: nnn

{

"transactionID" : ABC1234567890

"price/time_unit" : 10

Bandwidth Continuation Request

Bandwidth Continuation Request

*POST https://FCCSAS.gov:8433/api/spectrum/Allocation*

Authorization: Basic xxxxxxxxxxxxxxxxxx

Accept: application/vnd.gov.fcc.sas+json

Body:

"operator": "ATT",

"PAL_id" : 123456,

"transactionID" : ABC1234567890

"leasePeriod" : {

"startDate" : "12/15/2013",

"startTime" : "19:00:00",

"duration" : 36000,

COMPUTERIZED METHODS AND APPARATUS FOR SPECTRUM ACCESS

CROSS REFERENCE TO RELATED APPLICATIONS

This disclosure claim the benefit of priority under 35 U.S.C. § 119(e) to the following applications, the contents of which are hereby incorporated by reference in their entirety:

U.S. Provisional Patent Application No. 61/911,960, filed Dec. 4, 2013, entitled COMPUTERIZED METHODS AND APPARATUS FOR SPECTRUM ACCESS;

U.S. Provisional Patent Application No. 61/983,086, filed Apr. 23, 2014, entitled COMPUTERIZED METHODS AND APPARATUS FOR SPECTRUM ACCESS;

U.S. Provisional Patent Application No. 61/983,089, filed Apr. 23, 2014, entitled COMPUTERIZED METHODS AND APPARATUS FOR SPECTRUM ACCESS;

U.S. Provisional Patent Application NO. 61/983,095, filed Apr. 23, 2014, entitled COMPUTERIZED METHODS AND APPARATUS FOR SPECTRUM ACCESS;

U.S. Provisional Patent Application No. 61/983,099, filed Apr. 23, 2014, entitled COMPUTERIZED METHODS AND APPARATUS FOR SPECTRUM ACCESS; and U.S. Provisional Patent Application No. 62/024,302, filed Jul. 14, 2014, entitled COMPUTERIZED METHODS AND APPARATUS FOR SPECTRUM ACCESS.

TECHNICAL FIELD

Embodiments of the invention generally relate to computerized methods and apparatus for spectrum access.

BACKGROUND

Increasing broadband capacity has become a priority for the federal government as the demand for wireless broadband capacity has grown much faster than the availability of new spectrum. One of the areas identified as promising for future development of increasing broadband capacity is the 3.5 GHz Band. The 3.5 GHz Band has traditionally been reserved for critical users such as hospitals, utilities, state and local governments, and/or other users with a distinct need for reliable, prioritized access to broadband spectrum at specific, localized facilities. Allowing non-critical users to use the 3.5 GHz band requires a solution that balances maintaining quality of service for critical users and maximizing productive and efficient use of the band by non-critical users.

SUMMARY OF THE INVENTION

In some embodiments, computerized systems and methods are disclosed for controlling access to shared spectrum in which access is prioritized among different classes of devices so that top priority devices have immediate access to the shared spectrum and lower priority devices contend for access. In some embodiments, the computerized systems and methods include managing, by the spectrum access system, a set of priority classes of devices to use the shared spectrum, wherein the devices comprise a network entity, a network infrastructure node, user equipment, or any combination thereof, and wherein each priority class from the set of priority classes has different access rights to the shared spectrum, and wherein devices not associated with a top priority class can register with the spectrum access system, apply for permission to request use of a portion of the shared spectrum, and request use of a portion of the shared spectrum. The set of priority classes includes a first priority class that has a top priority to use the shared spectrum over remaining priority classes in the set of priority classes, such as second, third, and/or fourth priority classes, such that first priority devices associated with the first priority class have immediate access to a portion of the shared spectrum, and the spectrum access system limits access for any devices that are associated with the remaining priority classes and that may cause interference to the first priority class, from using the shared spectrum while first priority devices use the shared spectrum. The set of priority classes includes a second priority class that has a priority below the top priority of the first priority class such that devices associated with the second priority class can register with the spectrum access system, apply for permission to request use of a portion of the shared spectrum, and request use of a portion of the shared spectrum. The spectrum access system receives a registration request from a device associated with the second priority class that would like to use shared spectrum managed by the spectrum access system. The spectrum access system creates a registration record for the device based on the registration request, and storing the registration record in a priority access database to register the device with the spectrum access system so that the device can contend with other devices in the second priority class to use the shared spectrum. The spectrum access system receives an application from the device for permission to make requests to the spectrum access system to request use of a portion of the shared spectrum during a use period for the shared spectrum; updating, by the spectrum access system, the registration record for the device so that the device can make requests to use a portion of the shared spectrum during the use period. The spectrum access system receives an access authorization request from one or more devices, wherein the access authorization request comprises a request to use a portion of the shared spectrum during the use period. The spectrum access system manages a decision making process between the one or more devices, the decision making process utilizing information in the access authorization requests from each requesting device to decide whether to grant each of the one or more devices access to the shared spectrum. The spectrum access system grants rights to one or more of the requesting devices, to use a portion of the shared spectrum during the requested use period based on the decision making process.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

FIG. 11 illustrates fields in a Registration Record in the PAD related to Entity Classes, in accordance with some embodiments.

FIG. 12 illustrates a bandwidth authorization request, in accordance with some embodiments.

FIG. 13 illustrates a structure for a response message, in accordance with some embodiments.

FIG. 14 illustrates a bandwidth authorization response, in accordance with some embodiments.

FIG. 15 illustrates a bandwidth authorization response, in accordance with some embodiments.

FIG. 16 illustrates a bandwidth continuation request, in accordance with some embodiments.

DETAILED DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

The techniques described herein have been proposed for use in Commission Seeks Comment on Licensing Models and Technical Requirements in the 3550-3650 MHz Band, GN Docket No. 12-354, *Public Notice*, FCC 13-144 (2013) (Revised Framework Public Notice); Amendment of the Commission's Rules with Regard to Commercial Operations in the 3550-3650 MHz Band, GN Docket No. 12-354, *Further Notice of Proposed Rulemaking*, FCC 14-49 (2014); and Amendment of the Commissions' Rules with Regard to Commercial Operations in the 3550-3650 MHz Band, GN Docket No. 12-354, Notice of Proposed Rulemaking, FCC 12-148 (2012) (3.5 GHz NPRM), the disclosures of which are hereby incorporated by reference in their entirety.

Figure 1:
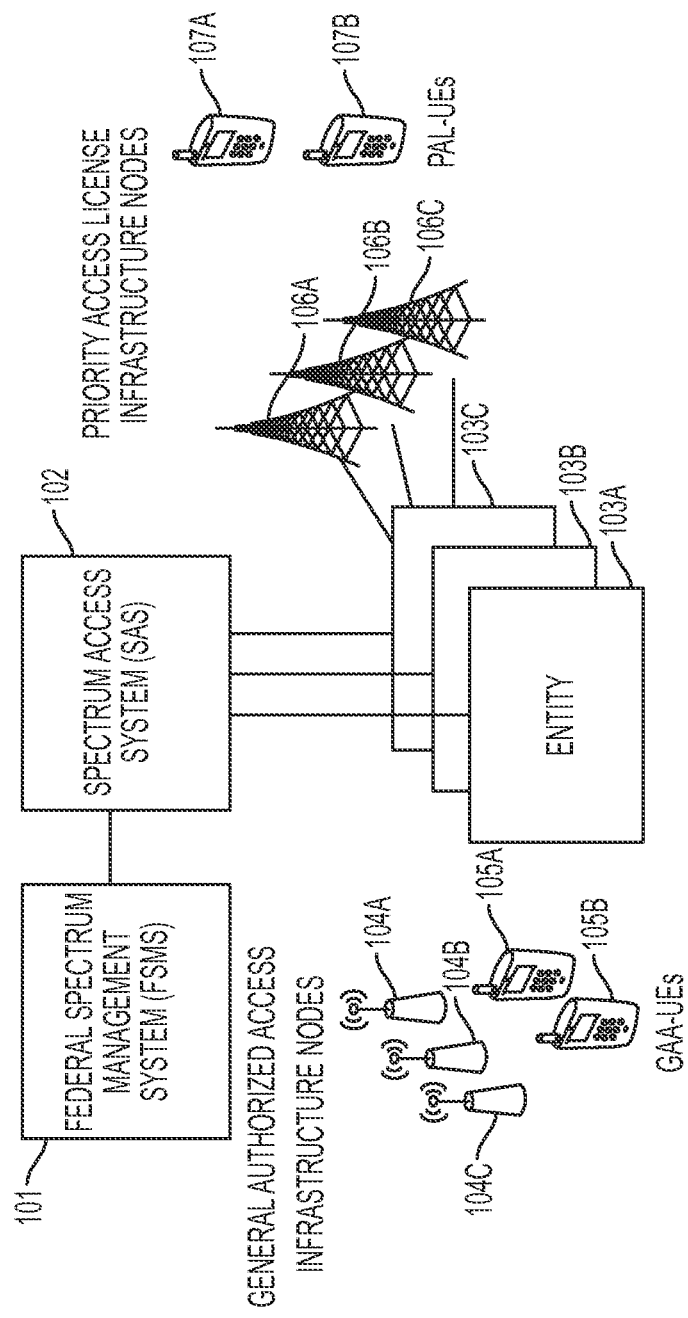
FIG. 1 illustrates an exemplary shared spectrum system for spectrum access, in accordance with some embodiments.

FIG. 1 illustrates an exemplary shared spectrum system for spectrum access, in accordance with some embodiments. FIG. 1 shows federal spectrum management system (FSMS) 101, spectrum access system (SAS) 102, entities 103A 103B 103C, General Authorized Access (GAA) Infrastructure Nodes 104A 104B 104C, General Authorized Access (GAA) User Equipment (GAA-UE) 105A 105B, Priority Access License (PAL) Infrastructure Nodes (PAL Infrastructure Nodes) 106A 106B 106C, and Priority Access License (PAL) User Equipment (PAL-UE) 107A 107B.

Federal Spectrum Management System 101 includes multiple databases including GEMSIS (Primarily DoD), NASA, Public Safety, the Federal Aviation Administration, the National Oceanic Atmospheric Administration, etc.

The Spectrum Access System 102 functions to govern and manage the interactions between devices in the shared spectrum band. It interacts with the Federal Spectrum Management System (FSMS) which contains information about the incumbent or Tier 1 Systems, interacts with Entities 103A, 103B, and 103C, and interacts with General Authorized Access (GAA) Infrastructure Nodes 104A, 104B, and 104C.

An Entity 103 is a legal person or corporation that operates some form of wireless network. For example, AT&T, Verizon, Dish Networks, Ruckus Wireless, etc.

General Authorized Access (GAA) Infrastructure Node (GAA Infrastructure Node) 104 is a node that GAA User Equipment (GAA-UE) connects to which can utilized spectrum to provide services wirelessly to connected users. For example, an 802.11 Wireless Access Point, or a TV White Space (TVWS) Node may be considered at GAA Infrastructure Node. GAA Infrastructure Nodes are not managed by a network Entity.

General Authorized Access (GAA) User Equipment (GAA-UE) 105 is an end user device that associates with and connects to a GAA Infrastructure Node. For example, a smartphone equipped with 802.11n capability that connects to an 802.11n Wireless Access Point (a GAA Infrastructure Node) is a GAA-UE. Note that a GAA-UE may also be a PAL-UE (for example, a smartphone which has both an 802.11 radio and an LTE radio).

Priority Access License (PAL) Infrastructure Node (PAL Infrastructure Node) 106 is a node that PAL User Equipment (PAL-UE) connects to which can utilized spectrum to provide services wirelessly to connected users. PAL Infrastructure Nodes are managed by a network Entity. For example, a PAL Infrastructure Node could be an eNodeB, a Base Transceiver Station (BTS), a carrier managed 802.11 Wireless Access Point, a carrier small cell, etc.

Priority Access License (PAL) User Equipment (PAL-UE) 107 is an end user device that associates with and connects to a PAL Infrastructure Node that is associated with an Entity. For example, an LTE capable smartphone that connects to an LTE eNodeB that is part of a mobile network operator's (for example, AT&T) infrastructure, is a PAL-UE. A GAA-UE can also be a PAL-UE (for example, a smartphone which has both an 802.11 radio and an LTE radio).

Figure 2:
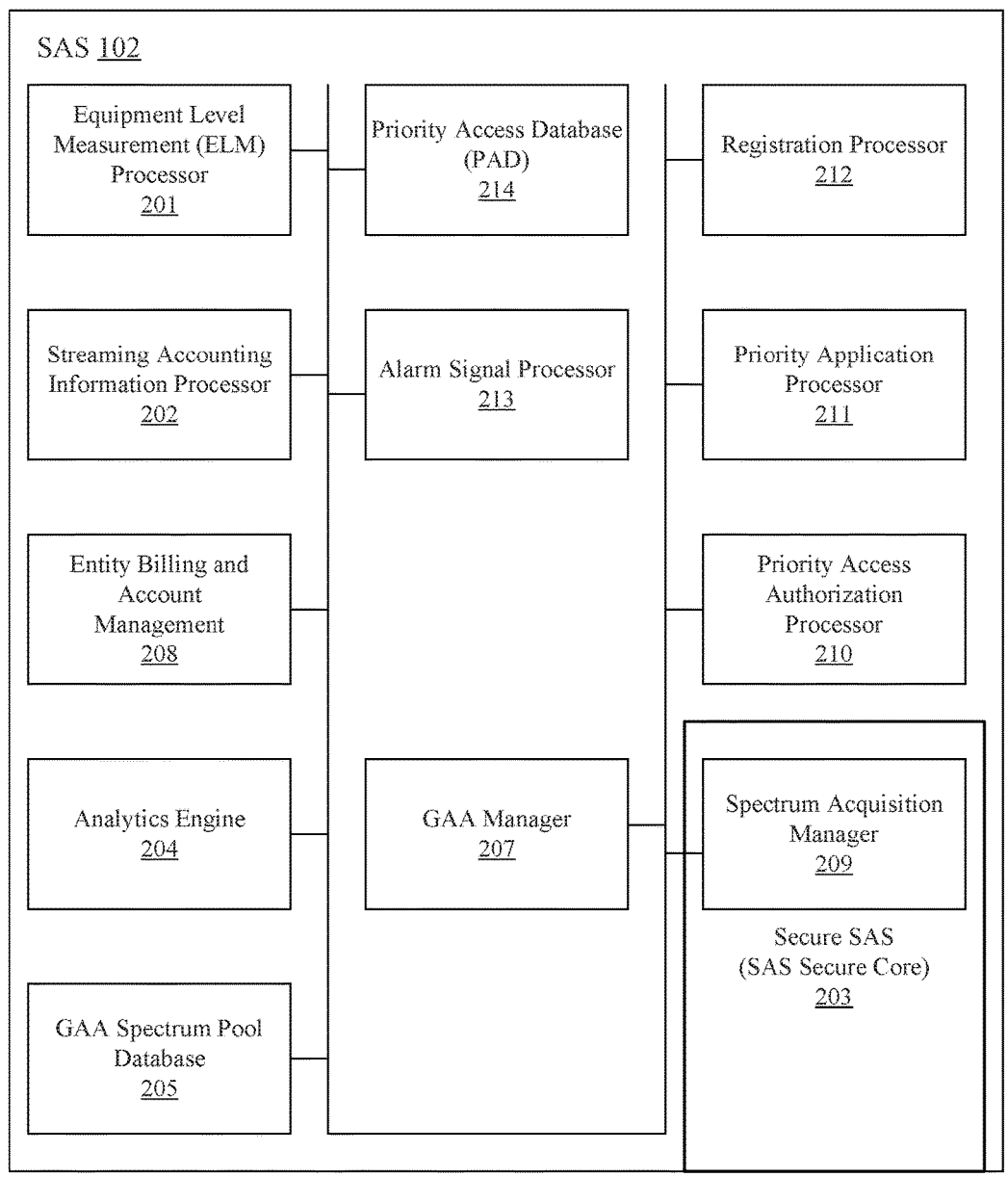
FIG. 2 illustrates exemplary components of the spectrum access system shown in FIG. 1 for spectrum access, in accordance with some embodiments.

FIG. 2 illustrates exemplary components of the spectrum access system shown in FIG. 1 for spectrum access, in accordance with some embodiments. FIG. 2 shows Equipment Level Measurement (ELM) Processor 201, Streaming Accounting Information Processor 202, Secure SAS (SAS Secure Core) 203, Analytics Engine 204, GAA Spectrum Pool Database 205, GAA Manager 207, Entity Billing and Account Management 208, Spectrum Acquisition Manager 209, Priority Access Authorization Processor 210, Priority Application Processor 211, Registration Processor 212, Alarm Signal Processor 213, and Priority Access Database (PAD) 214.

Equipment Level Measurement (ELM) Processor 201 receives, aggregates, processes and analyzes one or more of the received sensing measurements from Infrastructure Nodes and User Equipment. The processed ELM measurements are used to determine spectrum usage by one or more pieces of equipment (both federal and non-federal) in the shared spectrum band.

Referring to the Streaming Accounting Information Processor 202, Infrastructure Nodes 104 that are capable of operating in shared federal spectrum may be required to open an API to the SAS which feeds to the SAS Real Time Accounting Streams. Such accounting streams might include details on the radio resource management that has taken place at the Infrastructure Node, what mobile broadband sessions have occurred, what SMS or circuit switched activity has occurred, etc. This information may be collected and managed by Infrastructure Nodes or Entities on a per UE basis, and could be sent to the SAS with the specific UE identifying information removed, or such identifying information could be passed to the SAS as well. The SAS can process these real time accounting streams in order to determine how much of the shared spectrum allocated to that particular infrastructure node or Entity is being used at any given time.

The Secure SAS (SAS Secure Core) 203 may utilize Defense in Depth architecture, implementing one or more layers that have different security requirements and firewalls between them. The Secure SAS may be considered the inner core of the SAS, which is the portion of the SAS that interacts with the Federal Spectrum Management System. This part of the SAS is considered trusted by the Incumbent Tier entities. Specific firewalls may exist between the Secure SAS and the rest of the SAS. The Secure SAS may be owned and operated by a different vendor, manufacturer, or company than the rest of the SAS. The operator of the Secure SAS may need special security clearances.

The Analytics Engine 204 processes information from other parts of the SAS in order to determine various measured properties. For example, the analytics engine may calculate what percentage of the shared spectrum band is being used for the GAA Tier. The Analytics Engine may calculate the average spectrum efficiency of shared spectrum used by a particular entity (over frequency and time and geography) or a particular Infrastructure Node. It may calculate the average value of parts of the spectrum in different regions or at different times of the day, month, or year, etc.

The GAA Spectrum Pool Database 205 contains the spectrum that is available for GAA Infrastructure Nodes to access with permission of the SAS. This DB is dynamic as the spectrum available for GAA Tier use may changes over time and in different geographic locations. There may be a set floor or minimum amount of GAA Spectrum (e.g. 40% of the shared band) that is available in the GAA Spectrum Pool Database; however unused spectrum from the Priority Access Tier may be dynamically added to the GAA Spectrum Pool Database at any given time. The GAA Spectrum Pool may decrease in size also if some spectrum becomes unavailable due to Incumbent Tier usage. The SAS determines what spectrum is in the GAA Spectrum Pool Database at any given moment.

Referring to the GAA Manager 207, the manager processes manages the request and allocation of GAA Spectrum to GAA Infrastructure Nodes. The GAA Manager may receive Access Authorization requests and may manage dynamic allocation of GAA Bandwidth.

Entity Billing and Account Management 208 keeps track of sCash exchanged from Infrastructure Nodes and the Entity that those infrastructure nodes as associated with and determines how much the Entity owes the SAS for Priority Access to Federal Shared Spectrum each period.

The Spectrum Acquisition Manager 209 process interfaces with the Federal Spectrum Management System (FSMS) and determines what Federal Spectrum is available for use by any other users. It interfaces with Global Electromagnetic Spectrum Information System (GEMSIS) and other national databases at the level of temporal agility that they support.

The Priority Access Authorization Processor 210 process manages the Priority Access Authorization process as described in the three step registration process, including managing bidding and dynamic auction mechanisms and awarding authorizations and continuations of authorizations to successful bidders at the Allocation Transaction Price.

The Priority Application Processor 211 manages the Priority Application process between PAL Infrastructure Nodes or PAL Entities and the SAS.

Registration Processor 212 manages the registration process of the Entities, Infrastructure Nodes and/or UE.

The Alarm Signal Processor 213 is responsible for determining what part of the federal shared spectrum needs to be cleared of non-federal users. Generates the Alarm Signal, sends the Alarm Signal to PAL Infrastructure Nodes and UE, requests PAL Infrastructure Nodes and UE to transmit the Alarm Signal by Proxy, may transmits the alarm signal itself, and may receive the Alarm Signal when transmitted by Incumbent Tier Devices The Priority Access Database (PAD) 214 is a dynamic database that contains, within records, the information about one or more of Entity's, Infrastructure Nodes, UEs, and their associations with each other.

Figure 3:
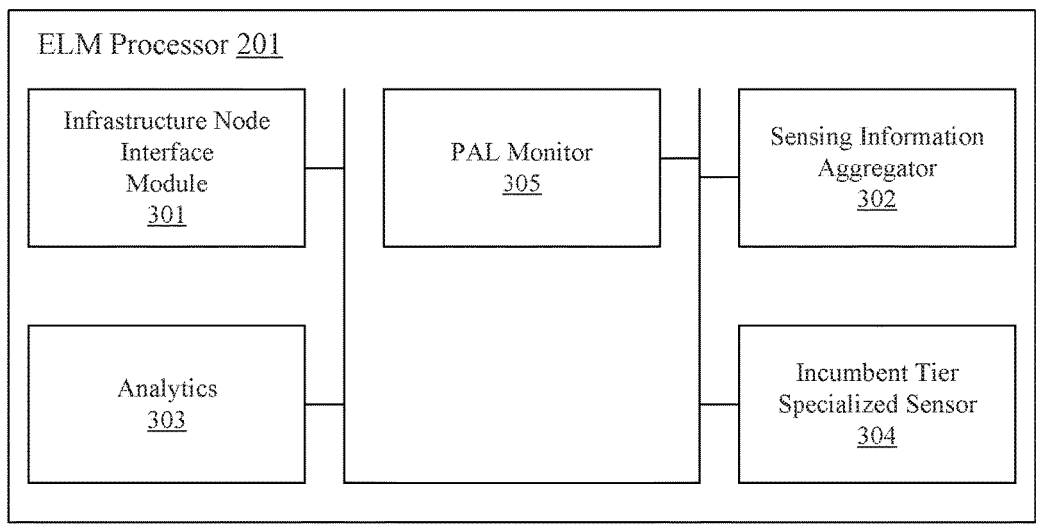
FIG. 3 illustrates exemplary components of equipment level measurements processor for spectrum access from FIG. 2, in accordance with some embodiments.

FIG. 3 illustrates exemplary components of equipment level measurements processor for spectrum access from FIG. 2, in accordance with some embodiments. FIG. 3 shows Infrastructure Node Interface Module 301, Sensing Information Aggregator 302, Analytics 303, Incumbent Tier Specialized Sensor 304, and PAL Monitor 305.

Infrastructure Node Interface Module 301 makes the connections from the ELM Processor to each of the infrastructure nodes in order to receive aggregated or individual sensing measurements from them.

Sensing Information Aggregator 302 is a module that collects ELM from various infrastructure nodes or from individual UE that are associated with various infrastructure nodes. The Sensing Information Aggregator additionally takes into account information about the various spectrum authorizations that those infrastructure nodes have and aggregates this information to get a clear idea what transmissions exist in any given spectral bandwidth or spectrum resource, over geographic location, frequency, and time.

Analytics 303 is a module that calculates, for example, spectrum utilization based on geography, frequency, and/or time. It can also calculate spectrum utilization analytics based on a specific Entity or Infrastructure Node. It can also process information based on Incumbent Tier signal detection in terms of Incumbent Tier usage of the shared spectrum resource.

Incumbent Tier Specialized Sensor 304 is a module that has special signal processing in order to be able to look for known Incumbent Tier spectral patterns that can be extracted from the ELM received by the SAS. This sensor may take information other processes within the ELM.

PAL Monitor 305 is a module that has knowledge from the PAD as to which PALs are in use by which Infrastructure Nodes, and can determine in this way how much each PAL is being utilized overall. This information can be fed to the priority application and access authorization processes in order to learn from past application permissions and access authorizations in order to improve spectral use.

Spectrum Access:

In some embodiments, access to shared federal spectrum may include a three-step access approach including registration, priority application, and access authorization.

Registration Process

The registration process results in records stored in the Priority Access Database (PAD). Registration is with the Spectrum Access System (SAS), and the record gets stored in the PAD. An entity that wishes to obtain Priority Access through priority application and authorization may first register with the Priority Access Database (PAD). In some embodiments, an entity can include one who owns or directs one or more infrastructure nodes that form a wireless communication network. The PAD registration may contain one or more portions of the information that would be necessary for the FCC to ensure that the Entity meets the legal constraints necessary for authorization to use federal shared spectrum at a priority access level.

The PAD may contain registration records for entities (for example, AT&T, Verizon, Dish Networks, Metro PCS, Starbucks WiFi network, etc.) that intend to use shared federal spectrum.

The PAD may contain registration records for Infrastructure Nodes (consisting of Priority Access License (PAL) Infrastructure Nodes and General Authorized Access (GAA) Infrastructure nodes, which may be for example a NodeB, eNodeB, Microwave Station, 802.11 access point, etc.) that intend to use federal shared spectrum.

The PAD may contain registration records for User Equipment (UE) that intend to use federal shared spectrum. User Equipment (UE) registration in the PAD can be done at type certification or at the manufacturing stage for type certified devices (type certified means devices that are approved to work in federal spectrum bands), or UE registration may be managed by the Infrastructure Node for example The registration record for an Entity may contain, for example, the information which is in FCC (Federal Communications Commission) Form 160, FCC Form 175, FCC Form 601, and FCC Form 602 and additional information.

An Entity can make the registration electronically between the Entity Core Network (for example, from the Mobility Management Entity (MME), from the Home Subscriber Service (HSS), from the Home Location Register (HLR), from the Packet Data Network Gateway (P-GW), or some other node in an entity core network) and the SAS (unlike today where web based forms need to be completed and filed electronically with the FCC, or printed, filed out, and mailed to the FCC).

Information in the PAD may be dynamic and not static, and may be used to make real time decisions about Priority Applications and Priority Access Authorizations. The PAD may either interact directly with the SAS, or may be part of the SAS Entities, Infrastructure Devices, and UEs may have a record in the PAD before they can use any federal shared spectrum, e.g., they may register with the PAD before making a Priority Application or requesting a Priority Access Authorization.

Unique IDs may be assigned to Entities, Infrastructure Nodes, and UEs. There may be a way to associate Entities with Infrastructure Nodes (for example, Infrastructure Nodes that belong to that entity) by linking or combining or associating the unique IDs.

Similarly there may be a way to associate UEs with an Infrastructure Node (for example, the node that they are currently in communication with, or the node that they are attached to, or a node that they belong to a closed user group with (for instance if the node is a home eNodeB)), noting that this association may change due to mobility. Associations between UE and Infrastructure nodes can be communicated to the PAD by the Infrastructure Node or by the UE.

A single company may create multiple Entity records in the PAD for each of their businesses. For example, if AT&T has a mobile network, they would create an entity record specifically for that mobile network. If they also e.g. run a mobile backhaul network, they would create a separate entity record for the mobile backhaul network. Separating entity records in this way allows companies to keep their business divisions separate for billing and management purposes.

Entities may be grouped in entity "classes", which represent systems that have similar properties. For example, there might be a class for wireless backhaul systems, and there might be a class for mobile network operators, and there might be a class for private indoor Long Term Evolution (LTE) network operators, etc. Grouping the entities into classes assists later in the Priority Application and Access Authorization processes, helping the SAS to assess which systems can coexist and share spectrum and which cannot.

Infrastructure nodes may also be grouped in classes, for example there may be a class of macrocells, a class of microcells, a class of LTE capable infrastructure nodes, a class of 802.11 capable infrastructure nodes, nodes that are for listening only, etc.

UEs may also be grouped in classes, for example based on maximum output power, based on Receiver Sensitivity, based on other radio capabilities, etc.

Other databases in wireless networks include the Home Location Register (HLR) and the Home Subscriber Server (HSS). There may be a number of differences between the PAD and the HLR and the HSS. For example, in some embodiments the HLR is the main database of permanent subscriber information for a mobile network. The HLR is maintained by a single Entity (e.g. AT&T has an HLR), whereas the PAD may contain the information from one or more Entities that wish to access the shared spectrum resource (e.g. AT&T and Verizon and Sprint, etc.)

In some embodiments, the HLR contains details of each mobile phone subscriber (UE) that is authorized to use the GSM core network as identified by the SIM card. The PAD contains details of each UE that is authorized to use shared spectrum, regardless of which network they belong to.

In some embodiments, the HLR contains user information such as address, account status, and preferences. The PAD contains this information but can contain significantly more information, including legal information about the Entity itself (HLR is owned by the entity therefore does not do this), as well extensive information about deployment (for example, antenna height of an Infrastructure Node, Antenna Sector orientation, etc.) and radio characteristics of the Infrastructure Nodes and users (for example, maximum and minimum output power, etc.).

In some embodiments, the PAD creates records via the registration process directly from one or more Entities, but does not subsequently interact with the Entity, Node or UE directly. Unlike the information in the HLR, the PAD is not open to be queried by Entities. The PAD interacts with the SAS directly.

In some embodiments, the HLR data is stored for as long as a UE remains a subscriber with the mobile network operator. PAD records are stored as long as a UE wishes to use shared federal spectrum resources, regardless of the network with which they are associated. Associations between UEs and Infrastructure Nodes and Entities can change within the PAD without deleting the records in the PADs and needing to register again.

In some embodiments, the HLR is a system which directly receives and processes transactions and messages from elements in the mobile network, for example, the location update messages received as mobile phones roam around. The PAD records for mobile elements (UE or Infrastructure Nodes) are updated based on information from the SAS which is updated based on interaction between the SAS and the Infrastructure Nodes.

In some embodiments, the HSS is a master user database that supports the IP Multimedia Subsystem (IMS) network entities that actually handle calls, performing similar functions as the HLR except in an IMS network. It contains the subscriber profiles, performs authentication and authorization of the user and can provide information about the subscriber's location and IP information within an operator's network. The HSS assigns the IP Multimedia Private Identity (IMPI) which is a unique permanently allocated global identity assigned by the home network operator, and is used, for example, for Registration, Authorization, Administration, and Accounting purposes. Every IMS user has one IMPI.

If a UE is not registered, then it could be an illicit device. If such an illicit device interacts with the network in malicious ways, it could hide ownership and open attack vectors. Thus, UE registration in the PAD may be required.

UE registration via PAL and GAA Infrastructure Nodes with the SAS is also possible, for example UEs may register directly with the SAS, or the Infrastructure Node that a UE first attaches to may register the UE with the SAS. Alternatively, only the Infrastructure Node may have a registration record with the SAS, and the Infrastructure Node may be responsible for authenticating the UE that are attached to them and maintaining specific information about these UE locally at the Infrastructure Node rather than at the SAS.

If the UE registers directly with the SAS, this may be done over an IP Channel, which could be established by the UE connecting to a WiFi network and sending a message to a specific IP address for the SAS, for example.

In some embodiments, separate licenses are not required for individual GAA Infrastructure nodes. However in order to protect national security, the National Telecommunications and Information Administration PAD still needs information about the GAA Infrastructure Nodes that intend to use federal shared spectrum. Therefore a GAA Infrastructure Node record can be created in the PAD for each GAA Infrastructure Node which intends to utilize federal shared spectrum. This record can be referenced by the SAS in subsequent authorization requests from the GAA Infrastructure Node.

Priority Application

Priority Application is the process by which an Entity requests permission to request priority access to certain PALs.

The PAD record for the entity may be referenced by the SAS in the priority application process. PAD records may contain information about the type of system the Entity has in order to assist the SAS to make informed decisions about which Entities it can approve a priority application for.

The Priority Access process may be part one of a two-part tariff. A two-part tariff can be an appropriate pricing system in competitive markets when consumers are uncertain about their ultimate demand. The Priority Application Fee forms the lump sum payment of the two-part tariff, and is analogous to the Upfront Payment typically required in the FCC Auction processes with the submission of FCC Form 175. The Priority Application Fee may vary from PAL to PAL, and also may vary depending on the class of the Entity that is requesting Priority for the PAL. For example, the Priority Application Fee for a given PAL required for an Entity that operates a point to point directional system may be different from the Priority Application Fee required for a Small Cell Network to request priority for the same PAL. The Priority Application Fee can be a flat fee charged on a yearly basis (once per Priority Application Period). The payment of this fee does not grant the Entity usage rights for the PAL; it gives the Entity the right to request Priority Access Authorization for subsets of the PAL for a given Access Authorization Period. The second part of the two-part tariff can be an Allocation Transaction Price which is part of the Priority Access Authorization process. This establishes a "pay-per-use" model, enabled by a dynamic auction process which reflects the competitive market for the scarce spectrum resource at any given point of time. The granularity of the pay-per-use period (the Access Authorization Period) can be significantly shorter than the Priority Application Period, therefore the Allocation Transaction Price is able to correctly reflect changes and fluctuations in market demand.

Priority Application may include a Priority Application fee, "Pay to get in", which can vary depending for example on the Entity Class, the location of the PAL, the frequency of the PAL, etc.

If there isn't a PAD record for the Entity, then the SAS may reject the Priority Application. Priority Applications may be applicable (that is, valid) for the Priority Application Period. In other words, if the SAS approves a Priority Application by an entity, it may be in force for the Priority Application Period, which could for example be for one year.

Applications may be accepted during an Application Window, which can be a period of time leading up to the start of a new Priority Application period. The Entity makes an application to the SAS, listing which PALs it is interested in having priority access for (by specifying a specific PAL, it is identifying both a frequency range as well as a geographic area, for example 10 MHz of unpaired spectrum in a specific geographic census tract).

The Entity may submit the Priority Application Fee for each specific PAL that is applying for, at the point in time when the Priority Application is made from the Entity to the SAS. The Priority Application Fees may be held in trust until the Priority Applications themselves are either accepted or denied. In some embodiments, when the SAS receives a Priority Application request from a specific Entity, the SAS can check the Entity record in the PAD, which may contain information about the type of system that the Entity has including, but not limited to, RF properties like TX Power, RSSI measurement capability, ACPR, antenna heights, frequency reuse pattern, etc. If no Entity record exists in the PAD, the Priority Application can be rejected by the SAS.

The SAS may approve a Priority Application for more than one Entity for a given PAL, even if the Entities are of the same entity class. Mutual exclusivity can be resolved during the Priority Access Authorization process via competitive bidding to be enabled by dynamic and flexible auction mechanisms. The SAS may allow Entities to make a Priority Application for multiple consecutive Priority Application Periods for a given PAL, in order to secure multiyear rights to request Priority Access Authorizations for that PAL while retaining flexibility through the short term Priority Access Authorization process.

The information sent with the Priority Application request is designed to supplement information that is already in the PAD Record for the Entity to include, but not limited to, information about the type of operations of the Entity. This choice of information sent at the Priority Application step is predicated on the assumption that the type of operations associated with the Entity are likely to be stable through the one year Priority Application Period. As this information can be stored by the SAS, it would not need to be sent with each individual Priority Access Authorization Bid, which serves to significantly reduce the size of those messages.

Successful Priority Application does not grant the entity permission to use the spectrum; it grants the entity the permission to bid for Priority Use of the spectrum for authorization periods. The SAS determines which Priority Applications to approve and which not to. The SAS may approve more than one Priority Application for the same PAL, even if Entities are in the same entity class.

Figure 5:
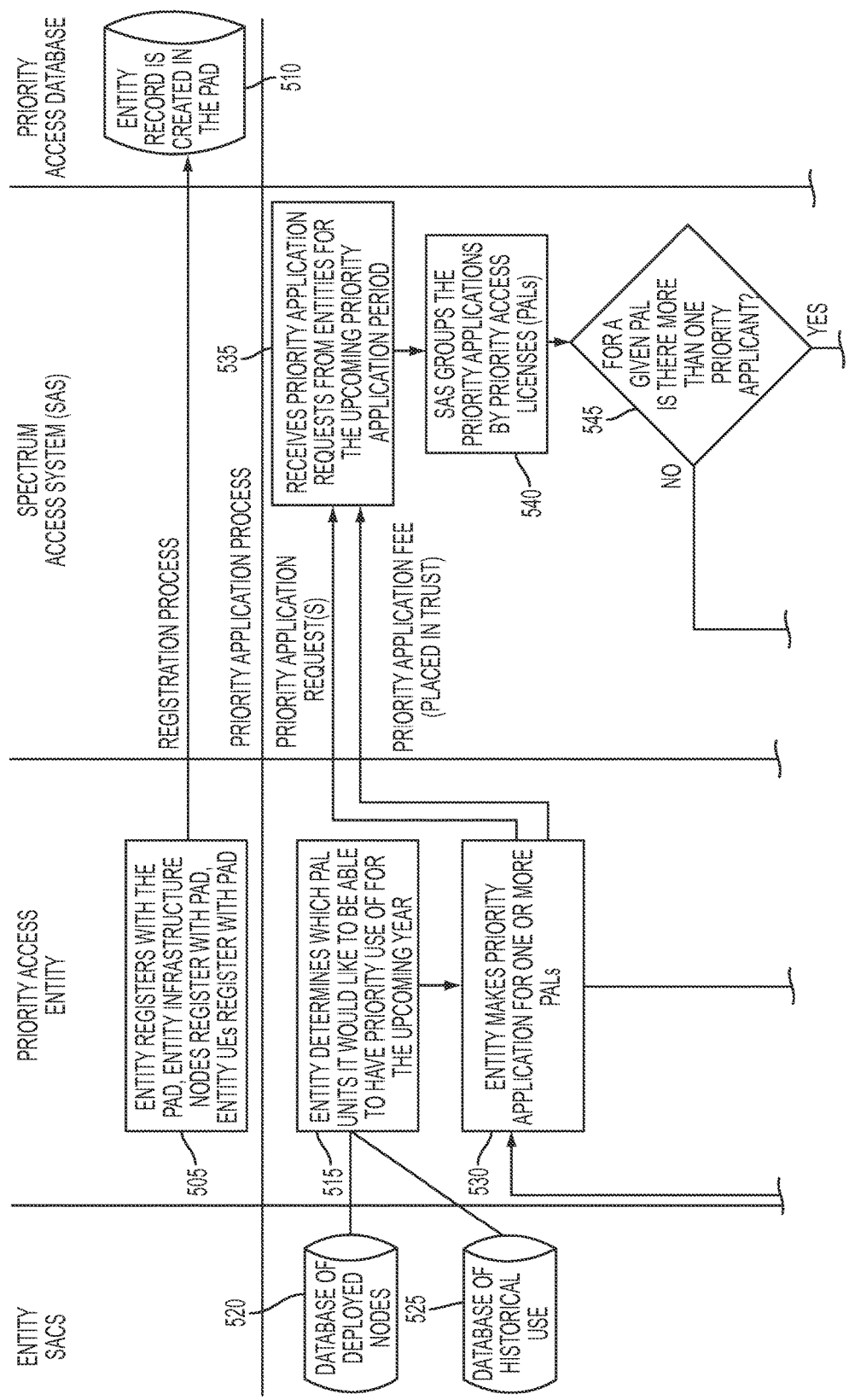
FIG. 5 illustrates an exemplary registration and priority application process for spectrum access, in accordance with some embodiments.
Figure 5:
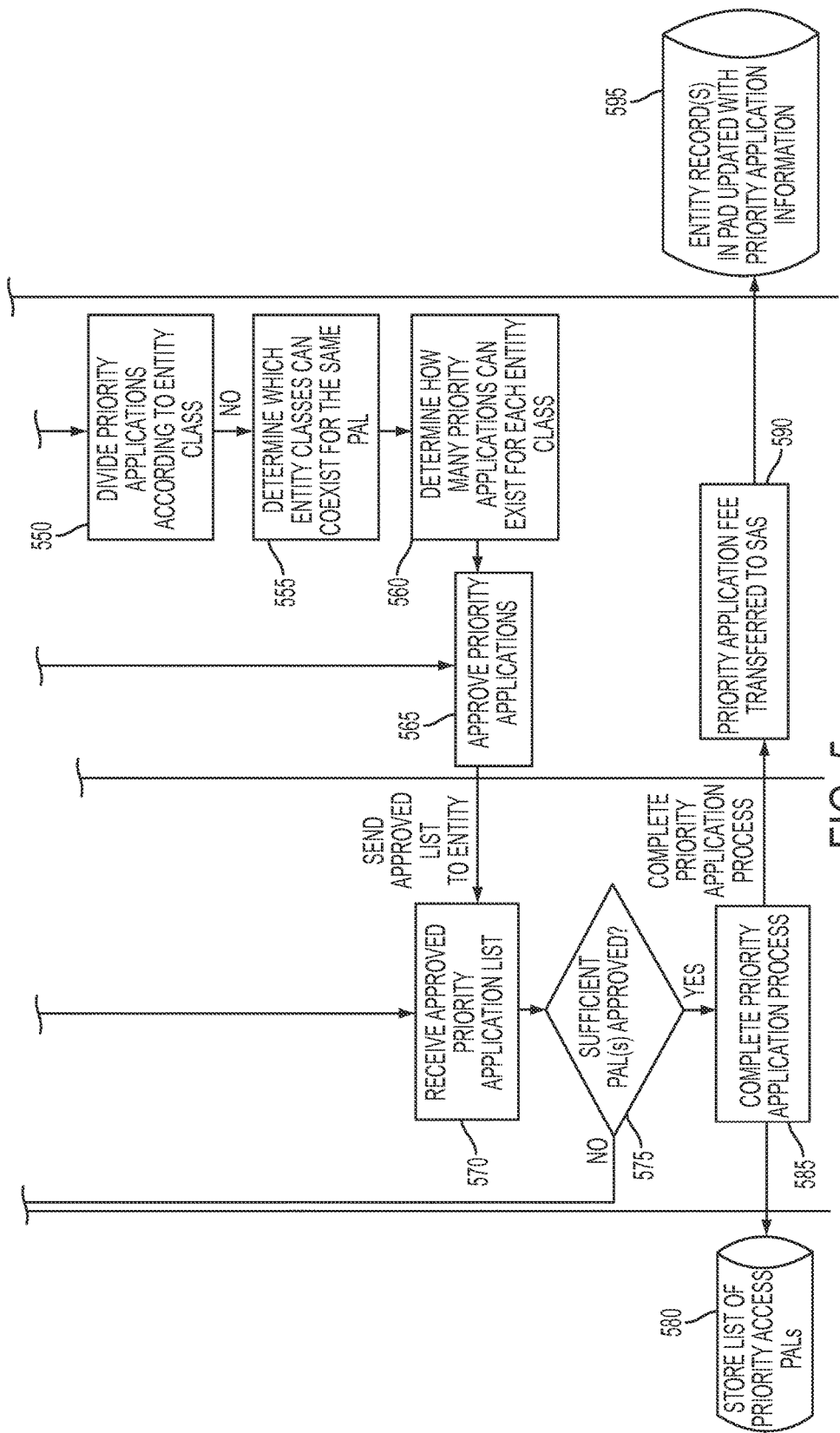

FIG. 5 illustrates an exemplary registration and priority application process for spectrum access, in accordance with some embodiments.

In step 505, an Entity Registers with the PAD, Entity Infrastructure Nodes Register with the PAD, and Entity UEs Register with the PAD. In step 510, an Entity Record is created in the PAD. In step 515, the Entity determines which PAL units it would like to be able to have priority use of for the upcoming year. PAL can be at least one of a Database of Deployed Nodes 520 and one of a Database of Historical Use 525. In step 530, the Entity makes Priority Application for one or more PALs.

In step 535, Priority Application Requests are received from Entities for the upcoming Priority Application Period. In step 540, the SAS groups the Priority Applications by Priority Access Licenses (PALs). In step 545, the PAL determines if there is more than one Priority Applicant for a given PAL. In step 550, the Priority Applications are divided according to Entity class. In step 555, it is determined which entity classes can coexist for the same PAL. In step 560, it is determined how many Priority Applications can exist for each Entity class. In step 565, Priority Applications are approved.

In step 570, an approved Priority Application List is received. In step 575, the sufficient PALs are approved or not approved. In step 585, the Priority Application process is completed. The list of Priority Access PALS is stored 580. In step 590, the Priority Application Fee is transferred to SAS. In step 595, the Entity records in PAD are updated with Priority Application Information.

Access Authorization

The access authorization process is the actual grant of priority use rights or general authorized access use rights for the authorization period. There can be at least two different types of Access Authorization. Priority Access Authorization is for Entities that have approved Priority Applications and that seek to utilize the Priority Access Tier. General Access Authorization (or simply Access Authorization) is for Infrastructure Nodes that seek to utilize spectrum as part of the GAA Tier.

The access authorization period may be short in length (for instance, a deci-hour or six minute period) and may be one or more orders of magnitude smaller than the Priority Application Period.

The access authorization period may be variable in length, and the length may depend, for example, on the type of Infrastructure, on the type or class of the Entity that the infrastructure is associated with, or on other factors like the mobility of the UE that are associated with the Infrastructure Node, etc.

In some embodiments, there is a payment associated with a Priority Access Authorization grant (pay per use). Access Authorizations for the GAA Tier may have no payment associated with them.

Access Authorizations can work at a much finer granularity than Priority Applications (which work at the PAL granularity). Access Authorization Requests can be for a subset of a PAL in time, geography, and frequency. Access authorization requests may be made directly from Infrastructure Nodes to the SAS. The SAS may manage access authorization requests from many different infrastructure nodes (which may be associated with different entities) to maximize efficiency of spectrum use.

The frequency granularity for access authorization may be subdivided to the smallest feasible LTE granularity (e.g., 108 kHz increments between 1.08 MHz and 19.8 MHz occupied bandwidth) or to another frequency granularity that is smaller than a PAL. The SAS may manage the smaller bandwidth increments between Infrastructure Nodes that are associated with an Entity that has Priority Approval for the PAL that contains the smaller bandwidth increments.

In some embodiments, an Entity may request authorizations for an entire PAL(s), and the SAS may manages the Access Authorization Requests on a PAL granularity. The winning entity or entities may be responsible for partitioning the full PAL worth of spectrum amongst their infrastructure nodes. In some embodiments, an Entity may request authorizations for entire PAL(s) or a portion of one or more PAL(s), but may be allowed to resell a subset of the PAL on a secondary market to other Entities that wish to have priority usage of that spectrum Individual UEs may not be allowed to request Access Authorizations directly from the SAS. Instead their requests may be managed by the PAL Infrastructure Nodes or GAA Infrastructure Nodes. The PAL Infrastructure Nodes or GAA Infrastructure Nodes may aggregate usage requirements of the UEs that are associated with them in order to determine the supplemental bandwidth requirement to request Priority Access Authorization for at any given time and in any given geography.

In some embodiments, the SAS may decline an Access Authorization request (Priority or not) in order to obfuscate federal operations, and not just if that spectrum is already maximally utilized.

According to some embodiments, Priority Access Authorization may be for a single Authorization Period only and the Nodes may have to make new requests for any subsequent periods. Alternatively, continuations may be allowed, which means that a PAL Infrastructure Node can request to use the spectrum resource for multiple authorization periods, at the same Allocation Transaction Price (successful bid). This may be done by the PAL Infrastructure Node expressing the number of periods that they wish to have priority access for at the start of the first period only and then not subsequently for each following period up to the total number of periods bid for. Alternatively, the PAL Infrastructure Node may need to make a "continuation" bid at the start of each new period to indicate to the SAS that it is interested in continuing to use that spectrum resource for the next authorization period, but without sending duplicate information each time, assuming the bandwidth and geographic needs of the request are the same. Payment may be due before the start of each subsequent period (e.g., in the form of transferred Spectrum Cash (sCash)).

In some embodiments, requiring Access Authorization requests to come from Infrastructure Nodes as opposed to Entities may make a probing attack more difficult. For example, in order to get information about availability of federal shared spectrum, an Entity would have to go well beyond just making one or more Priority Applications to the SAS and paying the Priority Application Fee, the Entity would have to deploy many Infrastructure Nodes in different geographic areas to make the Authorization Requests, which makes this kind of attack infeasible.

Figure 6:
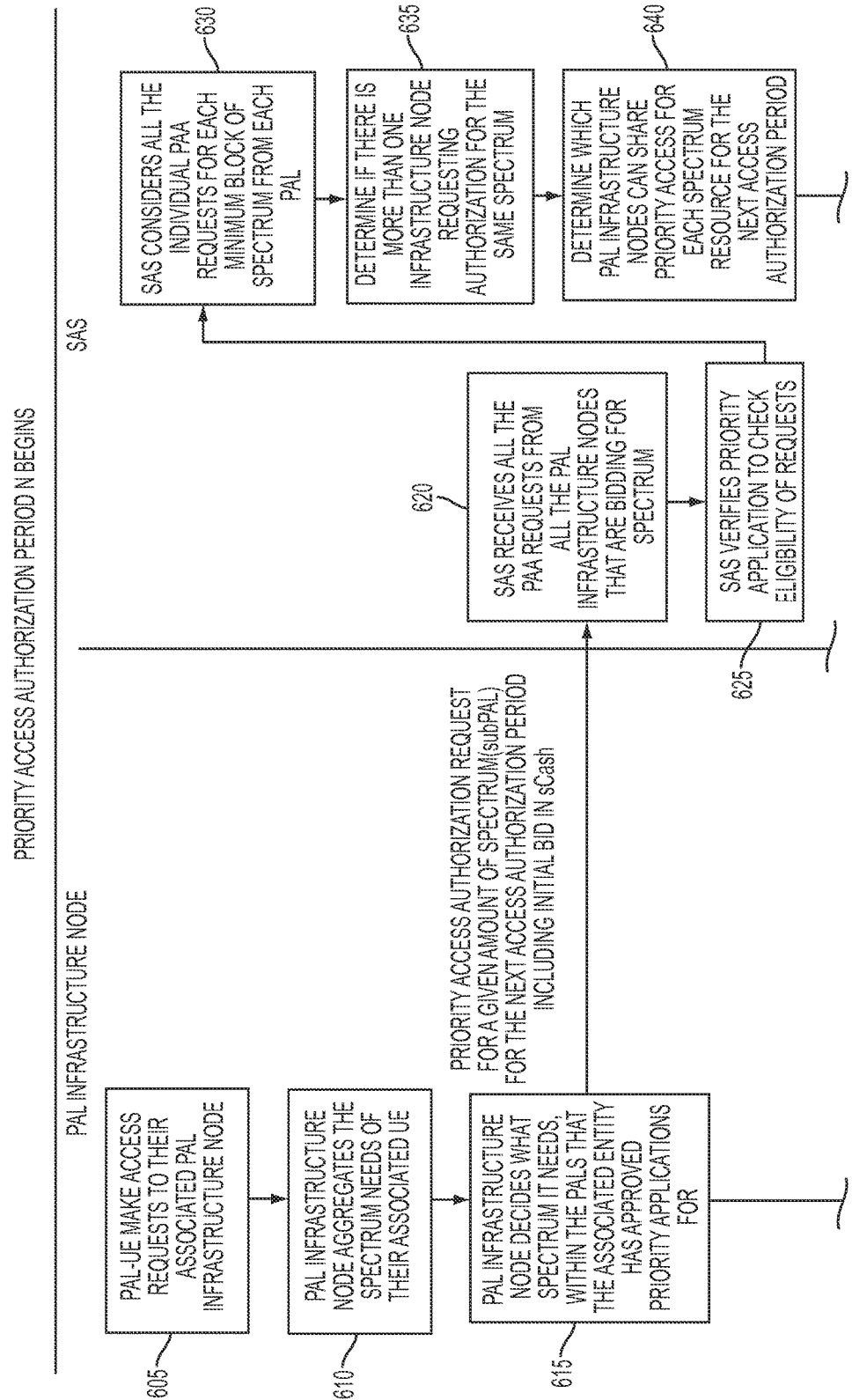
FIG. 6 illustrates an exemplary infrastructure priority access authorization process for spectrum access, in accordance with some embodiments.
Figure 6:
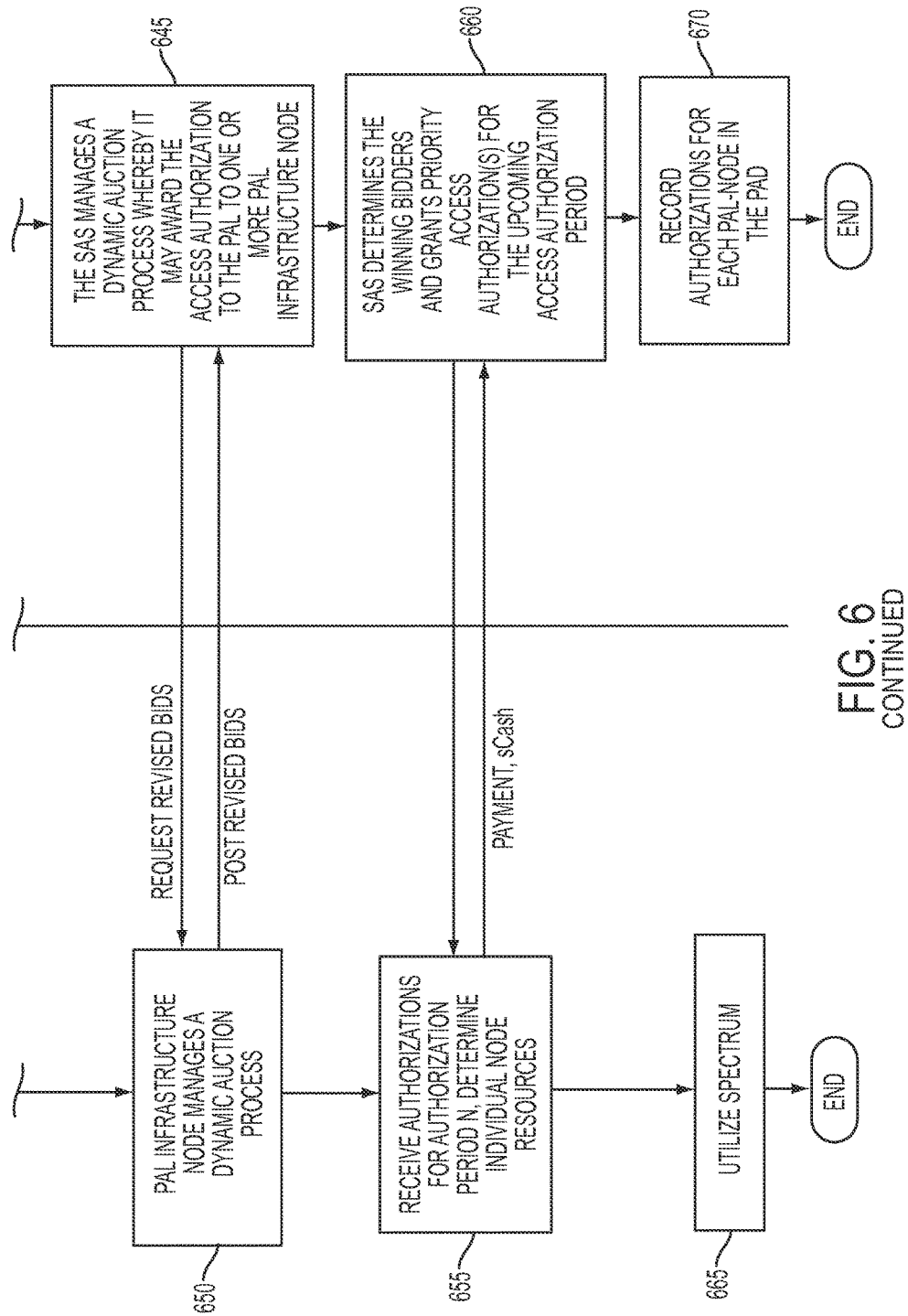

FIG. 6 illustrates an exemplary infrastructure priority access authorization process for spectrum access, in accordance with some embodiments.

In step 605, the PAL-UE makes access requests to their associated PAL Infrastructure Node. In step 610, the PAL Infrastructure Node aggregates the spectrum needs of their associated UE. In step 615, the PAL Infrastructure Node decides what spectrum it needs within the PALs that the associated Entity has approved Priority Applications for. In step 620, the SAS receives all the PAA requests from all the PAL Infrastructure Nodes that are bidding for spectrum. In step 625, the SAS verifies the Priority Application to check the eligibility of requests.

In step 630, the SAS considers all the individual PAA requests for each minimum block of spectrum from each PAL. In step 635, it is determined if there is more than one Infrastructure Node requesting authorization for the same spectrum. In step 640, it is determined whether PAL Infrastructure Nodes can share priority access for each spectrum resource for the next Access Authorization Period. In step 645, the SAS manages a dynamic auction process whereby it may award the Access Authorization to the PAL to one or more PAL Infrastructure Node.

In step 650, the PAL Infrastructure Node manages a dynamic auction process. In step 655, authorizations are received for the Authorization Period N, and Individual Node Resources are determined. In step 660, SAS determines the winning bidders and grants Priority Access Authorization(s) for the upcoming Access Authorization Period. In step 665, the spectrum is utilized. In step 670, authorizations are recorded for each PAL-Note in the PAD.

Figure 7:
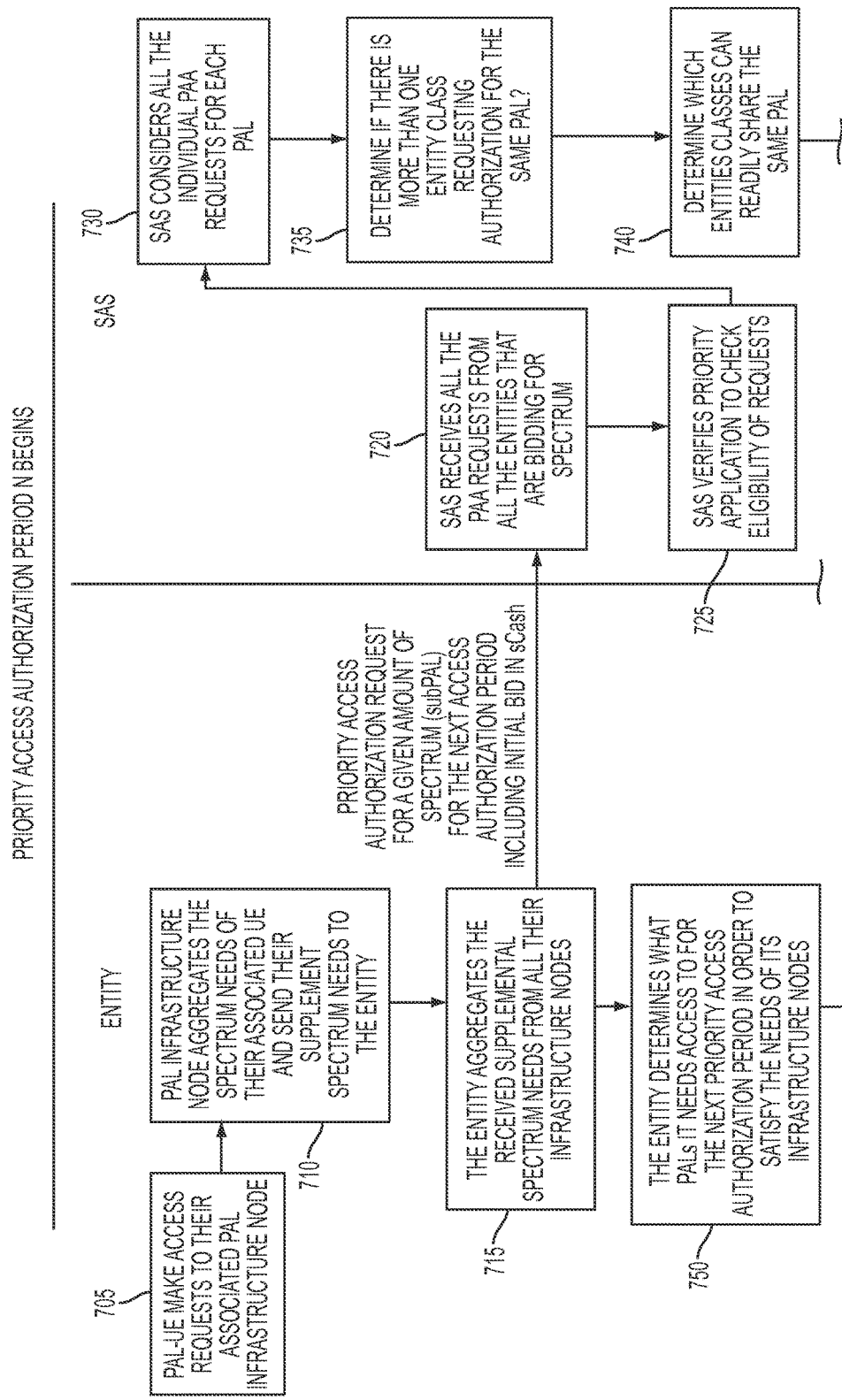
FIG. 7 illustrates an exemplary entity priority access authorization process for spectrum access, in accordance with some embodiments.
Figure 7:
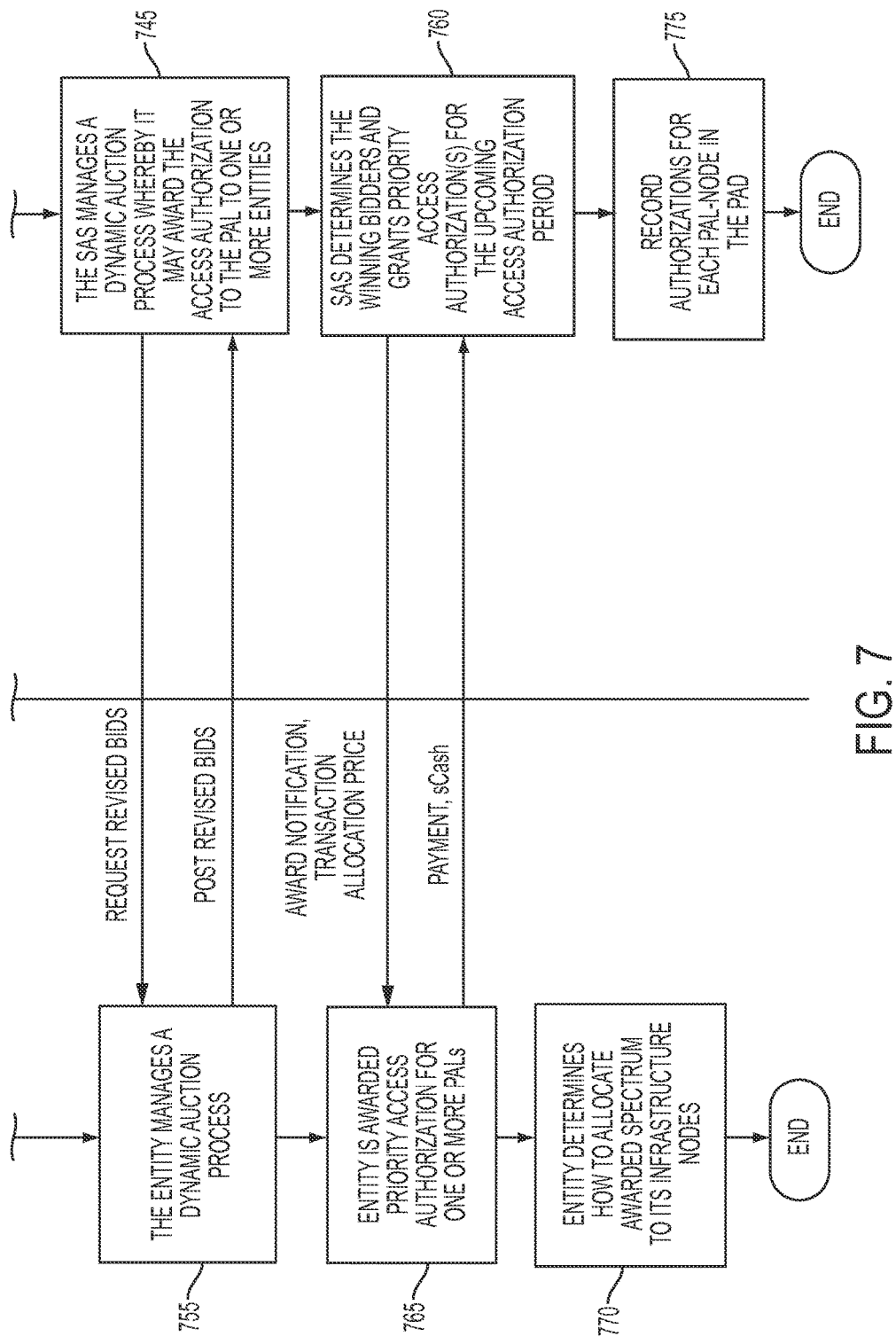

FIG. 7 illustrates an exemplary entity priority access authorization process for spectrum access, in accordance with some embodiments.

In step 705, the PAL-UE makes access requests to their associated PAL Infrastructure Note. In step 710, the PAL Infrastructure Node aggregates the spectrum needs of their associated UE and sends their supplement spectrum needs to the Entity. In step 715, the Entity aggregates the received supplemental spectrum needs from all their Infrastructure Nodes. In step 720, the SAS receives all the PAA requests from all the Entities that are bidding for spectrum. In step 725, the SAS verifies a Priority Application to check eligibility of requests.

In step 730, the SAS considers all the individual PAA requests for each PAL. In step 735, it is determined if there is more than one Entity Class requesting authorization for the same PAL. In step 740, it is determined which Entities Classes can readily share the same PAL. In step 745, the SAS manages a dynamic auction process whereby it may award the Access Authorization to the PAL to one or more Entities. In step 750, the Entity determines what PALs it needs access to for the next Priority Access Authorization Period in order to satisfy the needs of its Infrastructure Nodes. In step 755, the Entity manages a dynamic auction process. In step 760, the SAS determines the winning bidders and grants Priority Access Authorization(s) for the upcoming Access Authorization Period. In step 765, an Entity is awarded Priority Access Authorization for one or more PALs. In step 770, the Entity determines how to allocate an awarded spectrum to its Infrastructure Nodes. In step 775, an authorization for each PAL-Note in the PAD is recorded.

Figure 8:
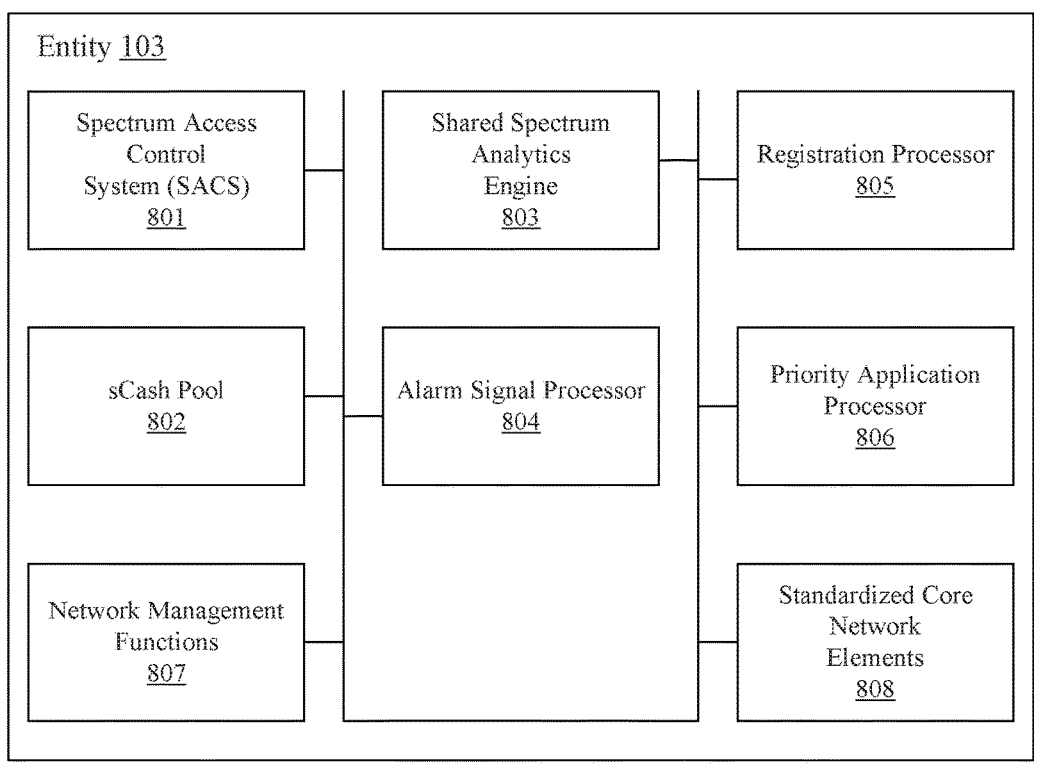
FIG. 8 illustrates an exemplary entity for spectrum access, in accordance with some embodiments.

FIG. 8 illustrates an exemplary entity for spectrum access, in accordance with some embodiments. FIG. 8 shows Spectrum Access Control System (SACS) 801, sCash Pool 802, Shared Spectrum Analytics Engine 803, Alarm Signal Processor 804, Registration Processor 805, Priority Application Processor 806, Network Management Functions 807, and Standardized Core Elements 808.

Spectrum Access Control System (SACS) 801 controls use of shared spectrum resources. The SACS manages the generation of, and distribution of, sCash digital tokens to the Entity's Infrastructure Nodes.

sCash Pool 802 stores sCash digital tokens that have not been distributed to infrastructure nodes.

Shared Spectrum Analytics Engine 803 records and monitors shared spectrum use and generates analytics, for example spectral efficiency, percentage of time the spectrum needed to be vacated for Incumbent Tier Systems, quality of service based on measurements of noise and interference, dollar value of shared spectrum investments, etc.

Alarm Signal Processor 804 recognizes and generates (when requested by proxy) the Alarm Signal as previously defined.

Registration Processor 805 manages the registration between the entity and the Priority Access Database (PAD).

Priority Application Processor 806 manages the Priority Application for PALs of shared spectrum when the process is managed by the entity.

Network Management Functions 807 manages one or more network management functions for the entity, which may include resource allocations, user equipment management, etc.

Standardized Core Elements 808 represents one or more standardized core elements that exist in an entity network. For example, for AT&T their core network can include a Packet Data Network Gateway (P-GW), a Mobile Management Entity (MME), etc.

Entity Management—SACS—Spectrum Access Control System—and sCash

The Spectrum Access Control System is a process within an Entity network that manages that Entity's use of federal shared spectrum.

The Entity/SACS determines the amount of money that the Entity wishes to spend on priority access to supplemental shared spectrum for their network for an upcoming period.

The SAS may bill the Entity for the actual spectrum use of the Entities' PAL Infrastructure Nodes (association may be determined by linked records in the PAD) based on successful Priority Access Authorization requests and Allocation Transaction Costs. The SAS may require the entity to make an advanced deposit against future successful Priority Access Authorization requests by the Infrastructure Nodes associated with that entity, which may be debited as Access Authorization requests are approved or granted.

Payment for shared spectrum resources may be done using a digital token system called sCash. In some embodiments, sCash is a digital token that represents an actual amount of legal currency. The PAL Infrastructure Nodes bid for Priority Access shared spectrum resources using sCash, and the SAS, via sCash digital token accumulation, provides a complete audit trail of Priority Access shared spectrum costs for the Entity. The SACS thereby effectively controls and manages the Entity PAL Infrastructure Node capacity requests through the distribution of sCash. This leverages the existing network operator billing management systems.

The SACS distributes sCash to the PAL Infrastructure Nodes. The distribution of sCash may, for example, be based on its network knowledge, (e.g. location of PAL UEs, customer service level agreements) or may be based on business logic, or may be based on accumulated learning from past usage metrics in the network in order to determine which parts of the network are likely to need supplemental spectrum at any given time. The SACS may also take into account past Priority Access Authorization (PAA) requests from the PAL Infrastructure Nodes to the SAS.

The PAL Infrastructure Nodes may use information (for example, historical usage patterns, the number of UE that are attached to them, time of day, remaining sCash balance, type of UE request, etc.) to determine how to use the sCash that is allocated to them by the SACS. Allocation of sCash to nodes by the SACS may be done periodically, e.g. monthly.

When a PAL Infrastructure Node makes Priority Access Authorization request to the SAS, it may make a bid using sCash. A successful bid (e.g., winning the dynamic auction) means that the PAL Infrastructure Node has the right to use the spectrum resource that it bid on, and the PAL Infrastructure Node may transfer the sCash to the SAS. The SAS may provide a full accounting record back to the entity based on the sCash received from the PAL Infrastructure Nodes that belong to that Entity.

If a network operator is an integrated carrier with multiple operations of different classes (for example a carrier with a mobile network, as well as a wireless backhaul network), they may have more than one Entity record in the PAD, and they may choose to operate one SACS per Entity (e.g., one for the mobile network and one for the backhaul operations) in order to manage separate business divisions more effectively.

The PAL Infrastructure Node makes a Priority Access Authorization request to the SAS and includes specified parameters, for example frequency range, minimum necessary bandwidth, radio access technology, maximum output power, equivalent isotropically radiated power (EIRP) with resolution bandwidth (RBW), antenna radiation pattern, spectrum mask with lowest and highest possible frequencies, etc. In the Priority Access Authorization request, the PAL Infrastructure Node does not include information that is already known by the SAS, such as information that is part of the PAD record for the Entity or for the PAL Infrastructure Node itself, or information that was sent as part of the Priority Application process by the Entity for the PAL that includes the spectrum resource that the PAL Infrastructure Node is requesting Priority Access Authorization for. In addition, the PAL Infrastructure Node makes an initial sCash bid for the requested bandwidth. This process empowers individual PAL Infrastructure Nodes to request additional spectrum when and they need it, but within boundaries that the Entity SACS can control based on the PAL Infrastructure Node sCash balance.

When the SAS receives an Access Authorization request from a PAL Infrastructure Node (authorized by a network operator through the distribution of sCash), the SAS may have the information to decide whether or not to grant that request given the needs of federal spectrum usage. The SAS may decline the Priority Access Authorization for a given portion of a PAL in order to obfuscate sensitive federal operations, for example.

In some embodiments, the purpose of using sCash it to empower the Infrastructure Nodes to make the bids for spectrum themselves rather than the entity making the bids on their behalf This may enable a more secure architecture which is less vulnerable to probing attacks, for the reasons stated above. If the Infrastructure Nodes do not have some way to pay for the priority access authorizations that they request, then they cannot make them. If they do not have to consider the cost of their requests, then there is nothing to stop them from making requests all the time and creating a large financial liability for the Entity. Therefore sCash may be utilized to enable the flat architecture that provides the greater system security while still managing the control to the extent that an entity would require.

In some embodiments, there are two different approaches for Priority Access Authorizations. One approach allows continuations and one approach only allows authorization for a single Access Authorization Period.

Some embodiments of the present disclosure include a computerized method for managing an entity's use of shared spectrum in which access is prioritized among different classes of entities so that top priority entities may be granted immediate access to the shared spectrum and lower priority entities contend for access based on a bid, and each lower priority entity can allocate electronic payment tokens to a set of infrastructure devices owned by the lower priority entity so that the set of infrastructure devices can independently use the payment tokens to pay for use of the shared spectrum, the method comprising: storing, by a spectrum access control system, a set of electronic payment tokens that corresponds to a value available for an entity to spend to use shared spectrum; identifying, by the spectrum access control system, a set of infrastructure devices associated with the entity; and allocating, by the spectrum access control system, a portion of the set of electronic payment tokens to each of the infrastructure devices from the set of infrastructure devices so that each infrastructure device can independently use its associated electronic payment tokens to bid for use of the shared spectrum. In some embodiments, the allocation is based on past usage of the shared spectrum by the associated infrastructure device so that the infrastructure device has sufficient payment tokens to purchase an expected amount of shared spectrum needed by the infrastructure device.

Figure 9:
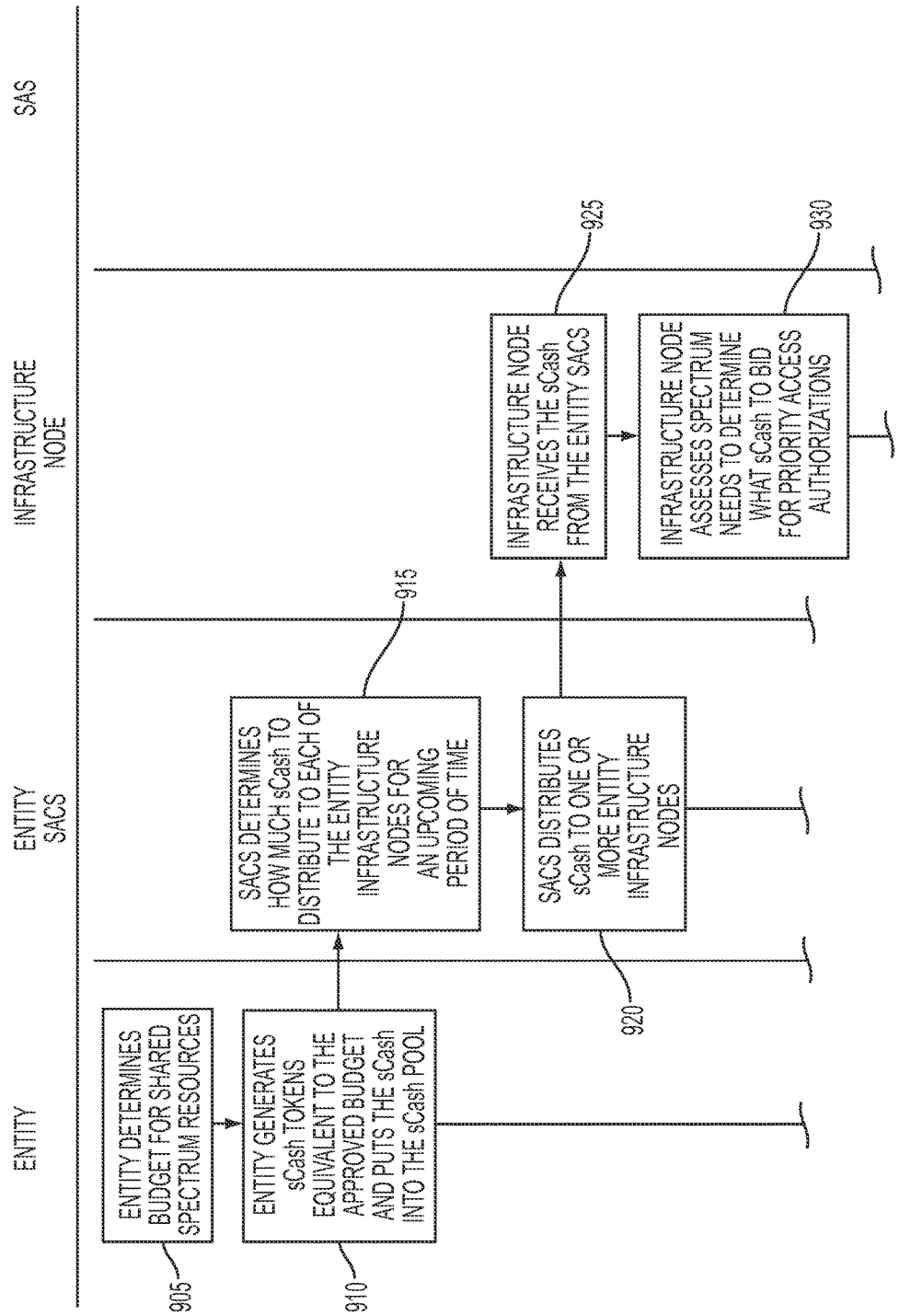
FIG. 9 illustrates an exemplary sCash usage case for spectrum access, in accordance with some embodiments.
Figure 9:
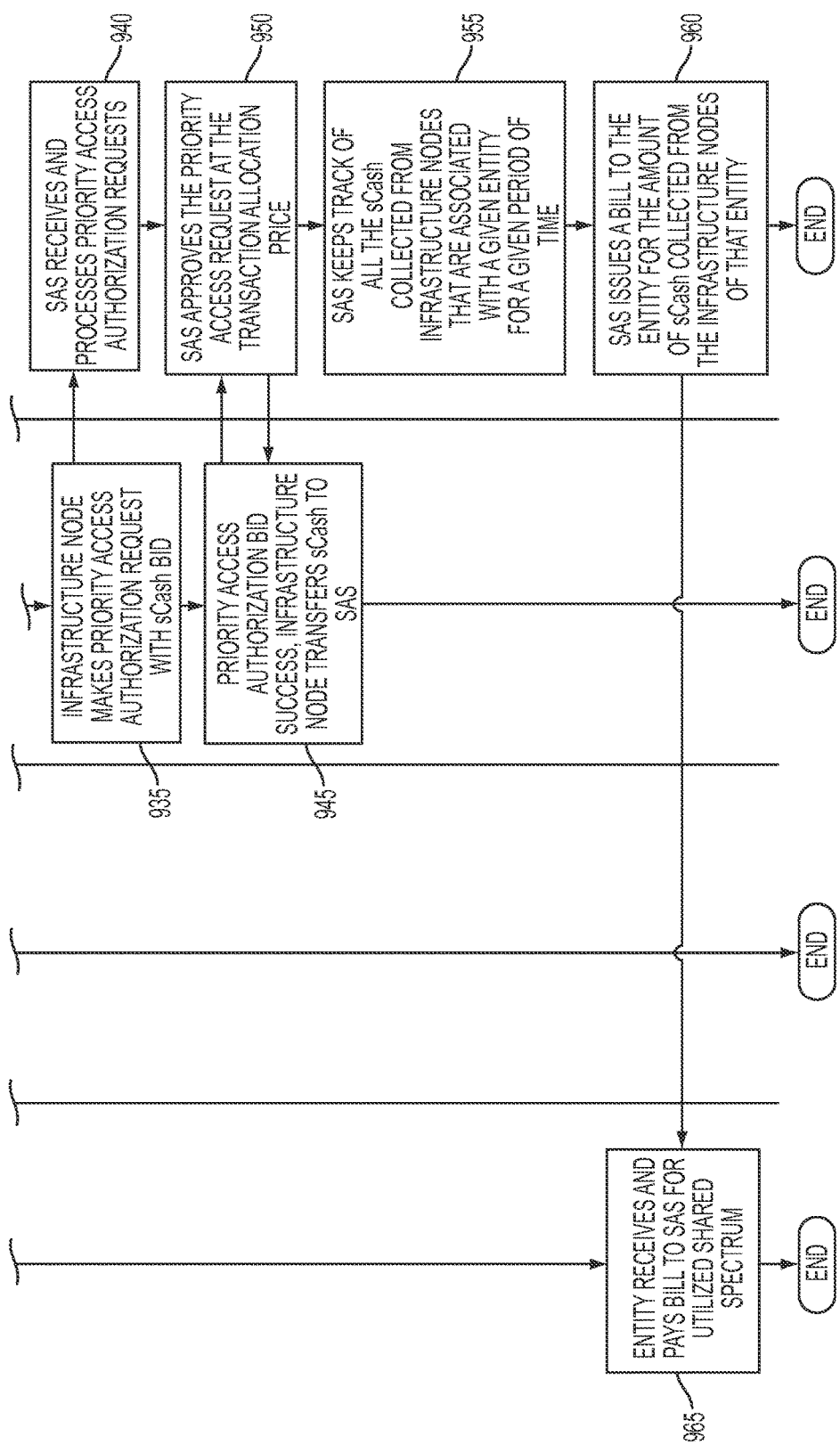

FIG. 9 illustrates an exemplary sCash usage case for spectrum access, in accordance with some embodiments.

In step 905, the Entity determines a budget for Shared Spectrum Resources. In step 910, the Entity generates sCash Tokens equivalent to the approved budget and puts the sCash into the sCash Pool. In step 915, the SACs determine how much sCash to distribute to each of the Entity Infrastructure Notes for an upcoming period of time. In step 920, the SACs distribute sCash to one or more Entity Infrastructure Nodes. In step 925, the Infrastructure Node receives the sCash from the entity SACs.

In step 930, Infrastructure Node assesses the spectrum needs to determine what sCash to bid for Priority Access Authorizations. In step 935, the Infrastructure Node makes the Priority Access Authorization Request with an sCash bid. In step 940, the SAS receives and processes Priority Access Authorization Requests. In step 945, if the Priority Access Authorization Bid is a success, the Infrastructure Note transfers sCash to the SAS. In step 950, the SAS approves the Priority Access Request at the Transaction Allocation Price.

In step 955, the SAS keeps track of all the sCash collected from the Infrastructure Notes that are associated with a given Entity for a given period of time. In step 960, the SAS issues a bill to the Entity for the amount of sCash collected from the Infrastructure Notes of that Entity. In step 965, the Entity receives and pays the bill to the SAS for the utilized shared spectrum.

Single Priority Access Authorizations

In some embodiments, if only Single Priority Access Authorizations are permitted, then the PAL Infrastructure Nodes may request Priority Access Authorization in each Access Authorization Period, regardless of whether or not the PAL Infrastructure Node had successfully bid for Priority Access Authorization in the previous Access Authorization Period.

In each Access Authorization Period, the SAS may consider one or more Priority Access Authorization Requests that it has received for the particular spectrum resource, and where necessary, conducts a dynamic auction where PAL Infrastructure Nodes can increase their sCash bid by the minimum bid increment in order to successfully win the right to use the spectrum resource.

Various kinds of traditional or innovative methodologies can be used to manage the dynamic auction process. The SAS can indicate the parameters of the Priority Access Authorization to the successful PAL Infrastructure Node for Access Authorization Period N. Continuations of Priority Access Authorizations If Continuations of Priority Access Authorizations are allowed, then a PAL Infrastructure Node that was granted Priority Access to a spectrum resource in Authorization Period N (at the Allocation Transaction Price, measured in sCash) may request a Continuation of Authorization for Access Authorization Period N+1 at the start of the next Access Authorization Period.

If the spectrum resource is still available for Priority Access during Access Authorization Period N+1, then the SAS may grant the PAL Infrastructure Node permission to continue using the same spectrum resource for Access Authorization Period N+1 for the previous Allocation Transaction Price. If continuations are permitted, a PAL Infrastructure Node may have increased certainty of being able to have use of a specific spectrum resource for a longer period of time at a known price, provided that the resource continues to be available for Priority Access use as previously described. For example, the SAS may grant the PAL Infrastructure Node permission to continue using the same spectrum resource for multiple future Access Authorization Periods, based on a duration request from the PAL Infrastructure Node.

Reserve Priority Access Authorization Bid

The SAS may establish a minimum reserve bid value for a given time, geography, and frequency granularity for each PAL. The minimum reserve bid may vary depending on several different factors, for example the time of day, the day of the week, specific Calendar days (e.g. Thanksgiving, Veterans Day), the month or the year, specific geography, spectrum resource geographic footprint size, bandwidth, etc.

If during the Priority Access Authorization process, no PAL Infrastructure Node submits a bid for a shared spectrum resource that is above the SAS reserve bid value for that specific spectrum resource, then the SAS can authorize the use of that specific spectrum resource to the GAA Tier for the duration of the current Access Authorization Period.

GAA Access Authorization

In some embodiments, a defined "floor" of GAA spectrum availability can be used to ensure that GAA access is available nationwide subject to Incumbent Access Tier use. This spectrum can be referred to as the GAA Spectrum Pool.

For the spectrum within the GAA Spectrum Pool, GAA Infrastructure Nodes make Access Allocation requests directly to the SAS for a spectrum resource for the next Access Authorization Period. The SAS can make a determination of whether or not to grant the GAA Infrastructure Node permission to access the requested spectrum resource. This determination may be based on Incumbent Access Tier use, obfuscation and security needs, and other GAA Infrastructure Node requests. The GAA Infrastructure Node may need to make a new request for the SAS for each subsequent Access Authorization Period, or alternatively the GAA Infrastructure Node may have permission to keep using the previously granted spectrum resource until the SAS indicates that the GAA Infrastructure Node needs to vacate the band and silence its transmitter and its GAA-UEs. A GAA-UE may not emit RF energy without first receiving permission from a GAA Infrastructure Node.

Additional GAA access to unused Priority Access bandwidth, as identified and managed by the SAS, is also one of the core concepts of the Revised Framework, and can serve to maximize dynamic use of the unutilized portion of the band, thereby ensuring productive use of the spectrum. If the SAS identifies to the GAA Tier that there is unused Priority Access bandwidth, the GAA Infrastructure Node may request permission to use this spectrum resource using the same GAA Access Authorization process.

SAS Use of Spectrum Sensing Data and Determination of Use of Spectrum

Infrastructure nodes and UEs may be required to sense power in shared federal spectrum. These measurements may be just in the federal spectrum band or may be for all the spectrum bands supported by the UE. The term for these sensing measurements is Equipment Level Measurements or ELM. These may, for example, include Channel State Information (CSI), Received Signal Strength Indicator (RSSI) measurements, Adjacent Channel Power Ratio (ACPR) measurements, band sweeping, etc.

The sensing information from individual UE may get aggregated at infrastructure nodes. Sensing Information, which may be an aggregation of sensing information, may be sent from the infrastructure nodes to the SAS. This may be sent at regular intervals, when the SAS requests it, or it may be included in any other message to the SAS (e.g., in a Priority Access Authorization request).

The SAS analyzes information sent from the infrastructure nodes and can use it for several purposes including, for example, for analytics (understanding how federal spectrum is being used), calculating the efficiency of entity use of the their priority spectrum, tuning access authorization period durations, and determining appropriate reserve bid amounts.

The SAS can also use this information for determining when/if a PAL Infrastructure Node is using spectrum that it holds a priority access authorization for. If a PAL Infrastructure Node is not using the spectrum that it holds a priority access authorization for, then the SAS can offer this spectrum to the GAA Tier or to a different Priority Infrastructure node that also holds an approved Priority Application for the PAL that contains this spectrum resource. The SAS can also use this information to determine if there is an incumbent tier system unexpectedly operating in one or more frequency channels in specific locations at a specific time.

Use of spectrum can also be determined by collection of precise real time accounting streaming data from entity networks (for example from Infrastructure Nodes in entity networks, or from core network nodes such as the Policy & Charging Rules Function (PCRF), the Online Charging System (OCS), the Traffic Detection Function (TDF), the Policy & Charging Enforcement Function (PCEF), and any other network nodes. Infrastructure Nodes or other network nodes in an entity that supports federal spectrum sharing can be required to have Application Programming Interfaces (APIs) that can be provided to the SAS in order to collect the real time accounting streaming data, or this data can be collected over any IP session at a higher layer of the protocol stack.

The SAS can use this data, or similar collectable data which indicates the resource usage within the entity network, to determine the usage level of Priority Access Authorizations. This determination may happen in real time or near real time. If this SAS determines that a Priority Access Authorization holder is not using granted spectrum by, for example, a given period of time after the start of the Access Authorization Period (for example, one minute into a six minute Access Authorization Period, it can make this spectrum available to the GAA Tier or to a different Priority Infrastructure Node that has an approved Priority application for the remainder of this Access Authorization Period.

According to some embodiments, a hybrid approach combining real time streaming accounting information with spectrum sensing and ELM may be used to have a better determination of exactly what spectrum is being used, by how many users, etc. This combined information could be used to determine for instance if an infrastructure node is deliberately using the resource inefficiently to be able to maintain priority access control over it.

In some embodiments, the ELM requirement for all Nodes and UEs should be no more than required for the equipment to operate efficiently in its own channel with respect to its own spectrum usage, assuring affordable introduction and rapid market uptake. Even such minimalistic spectrum measurement enables the collection of significant information on actual channel occupancy that the SAS to compute valuable analytics. The aggregate information could be combined with accounting information and used, for example, for tuning the Access Authorization Period durations, for determining the appropriate reserve bid amount, and for monitoring for anticompetitive behavior.

Alarm Signals

Incumbent Tier use may not be planned or may not be reflected in the federal spectrum management system databases or may not be known by the SAS, therefore preemptive clearing of federal spectrum in order to protect incumbent systems is not always possible. This can be due to basic needs for operational agility for federal systems, but also it can likely take time for the federal spectrum databases (e.g. GEMSIS) to have the temporal capabilities and real time flexibility needed to keep the SAS fully updated of all planned Incumbent Tier spectrum use. In the fullness of time, a majority of federal use of the band may be accurately and dynamically reflected in the GEMSIS database; however in the short run, based on a need for operational agility of federal systems, there is a high probability of unplanned Incumbent Tier use of the band. The SAS therefore needs a way of clearing spectrum resources near instantaneously when an Incumbent Tier system is detected. Spectrum clearing via Alarm Signal generation also supports the operational obfuscation of federal usage of the band.

Based on received ELM the SAS can determine 1) if there is an incumbent Tier system unexpectedly in the band, and 2) which portions of which PALs have the potential to negatively impact (for example, cause interference to) the incumbent tier system, or alternatively which portions of which PALs have the potential to receive interference from incumbent tier systems. Based on PAD information and Priority Application and Access Authorization records, the SAS may then know which infrastructure nodes (both PAL Infrastructure Nodes and GAA Infrastructure Nodes) and which of the UEs associated with these infrastructure nodes need to be silenced in order to prevent interference to the Incumbent Tier System.

According to some embodiments, a standardized Alarm Signal may be utilized. A signal may be transmitted using one or more formats. Included in the Alarm Signal may be a way to signal specific frequency channels, or specific location coordinates.

Equipment (Nodes and UEs) may be capable of recognizing the Alarm Signal and/or transmitting the Alarm Signal on request of the SAS or on request of their associated infrastructure node (for UEs), or based on other triggering events. Equipment may be capable of disabling one or more transmissions in a signaled channel upon detection of the Alarm Signal.

The SAS can pass an Alarm Signal Proxy to any communication equipment (e.g., directly to Infrastructure Nodes or to UEs via their associated infrastructure nodes) requiring this specific equipment to transmit the Alarm Signal allowing the SAS to be able to rapidly disable one or more transmissions in specific channels in very specific geographic areas.

The Alarm Signal may be transmitted over resources that are not part of the federal shared spectrum. This may be done such that the Alarm Signal doesn't interfere with the incumbent. Alternatively, this may be done for other reasons, for example because a different connection between the SAS and the recipient of the Alarm Signal is more robust, or less congested, or less expensive to use.

Alarm Signal transmission may be in licensed bands that are supported by the SAS and the recipient equipment (e.g. the carriers licensed spectrum) or could be in unlicensed bands that are supported by the SAS and the recipient equipment (for example, for the GAA Tier it could be transmitted in a WiFi band). The Alarm Signal transmission may be carried as an IP layer message over any connected path between the SAS and the recipient equipment. For example, Alarm Signals may comprise (a) a signal in the broadcast control channel for LTE, and (b) a physical layer beacon signal, and/or the like.

The Alarm Signal could contain specific information about the spectrum that needs to be vacated. The Alarm Signal could indicate which equipment needs to stop transmitting by including specific location information in the signal itself, such that equipment that receives the Alarm Signal can determine, based on the location information in the signal and knowledge of its own location information, whether it needs to stop transmissions and/or order its associated UE to stop transmissions.

The Alarm Signal could indicate which equipment needs to stop transmitting by including specific equipment unique identifiers in the signal itself, such that equipment that receives the Alarm Signal can look for its own unique identifier in the message as a way of determining if it needs to stop transmissions and/or order its associated UE to stop transmissions.

In some embodiments, the SAS could proxy the Alarm Signal to the appropriate infrastructure Nodes and UE, based on their known locations, power of transmissions, etc. thereby implicitly defining an exclusion zone. The SAS providing a proxy means that the SAS may tell various Infrastructure Nodes and UE to transmit the Alarm Signal on its behalf. Alternatively, the SAS may tell various Infrastructure Nodes to transmit the Alarm Signal on its behalf, and the UE may not be required to transmit the Alarm Signal. Alternatively the UE may receive the proxy indicating that they are to transmit the Alarm Signal from their associated Infrastructure Node and not from the SAS directly. Thus, any equipment that are able to "hear" any of the proxy Alarm Signals need to disable transmissions in the signaled frequency band.

The Alarm Signal could also be placed in the frequency band that needs to be vacated, such that the signaling is fully implicit—if an equipment can hear the Alarm Signal in a specific geographic area in a specific band, then the equipment needs to stop some or all transmissions in that band. The band that needs to be free of transmissions could be a predetermined bandwidth, e.g. the minimum LTE channel bandwidth (1.4 MHz), or could be an entire PAL, or could be some other known or signaled bandwidth increment.

There are several options for the duration of the suspension of transmission. Equipment may suspend transmissions as long as the Alarm Signal is being transmitted. Once the Alarm Signal has stopped, the infrastructure nodes could a) wait for instruction from the SAS that they can resume transmissions, or b) assume that any previous authorization (or continuation of authorization) that was for the signaled channel is discontinued. In that case, an infrastructure node may wait until the start of the next Access Authorization period and then specifically request new authorization for that channel.

Nodes may make other Access Authorization requests for shared spectrum while an Alarm Signal is present, provided that the requests are for a different spectrum resource than that indicated by the Alarm Signal.

The Alarm Signal may be generated by Incumbent Tier users of the band directly. Such an incumbent equipment generated Alarm Signal may be received by the SAS itself. If the SAS receives an incumbent equipment generated Alarm Signal, the SAS may proxy the Alarm Signal out to various Infrastructure Nodes and/or UE. Alternatively, the Incumbent equipment generated Alarm Signal may be received directly by the Infrastructure Node or the UE. Generation of the Alarm Signal by Incumbent Tier equipment may provide further operational obfuscation, initiated by and controlled by a particular incumbent entity, without recourse to the SAS, or even participation by the SAS per se, allowing a distributed operation that is scalable and that allows independency of action by each of the incumbent entities.

In some embodiments, a computerized method is disclosed for managing shared spectrum, wherein access to the shared spectrum is prioritized among different classes of devices so that top priority devices have immediate access to the shared spectrum and lower priority devices contend for access to use the shared spectrum when the shared spectrum is not being used by the top priority devices. In some embodiments, the lower priority devices are stopped from using the shared spectrum in the event that a top priority device needs to use the shared spectrum. In some embodiments, the devices comprise a network entity, a network infrastructure node, user equipment, or any combination thereof. In some embodiments, the method includes determining, by a spectrum access system, that a top priority device is using a spectrum band contained within shared spectrum managed by the spectrum access system. In some embodiments, the method further comprises identifying, by the spectrum access system, a set of priority access licenses for associated lower priority devices to use the shared spectrum, wherein use of a spectrum band associated with each priority access license from the set of priority access licenses may (a) negatively impact the top priority device's use of the spectrum band, (b) receive interference from the top priority device's use of the spectrum band, or both. In some embodiments, the method further comprises transmitting, by the spectrum access system, an alarm signal that causes each of the lower priority devices associated with the set of priority access licenses to stop using the shared spectrum.

In some embodiments, the lower priority devices are user equipment, and the computerized method further comprises: determining a set of infrastructure nodes communicating with the user equipment; and wherein transmitting the alarm signal comprises transmitting a proxy alarm signal to each infrastructure node from the set of infrastructure nodes to cause the infrastructure node to stop each user equipment from using the shared spectrum.

In some embodiments, the lower priority devices are user equipment; and transmitting the alarm signal comprises transmitting an alarm signal directly to each user equipment so that each user equipment stops using the shared spectrum.

In some embodiments, transmitting the alarm signal comprises transmitting a proxy alarm signal to the top priority device to cause the top priority device to transmit a beacon alarm signal that each of the lower priority devices recognize.

In some embodiments, transmitting the alarm signal comprises continuously transmitting the alarm signal while the top priority device is using the spectrum band.

In some embodiments, the computerized method further comprises terminating transmission of the alarm signal; and transmitting an instruction to each of the lower priority devices to notify the lower priority devices that the shared spectrum which was in use by the lower priority devices and which the alarm signal cleared can be requested for use during a next use period for the shared spectrum.

In some embodiments, the computerized method further comprises receiving, from one or more of the lower priority devices, a request to use a different spectrum band from the shared spectrum that is not associated with the alarm signal.

Figure 4:
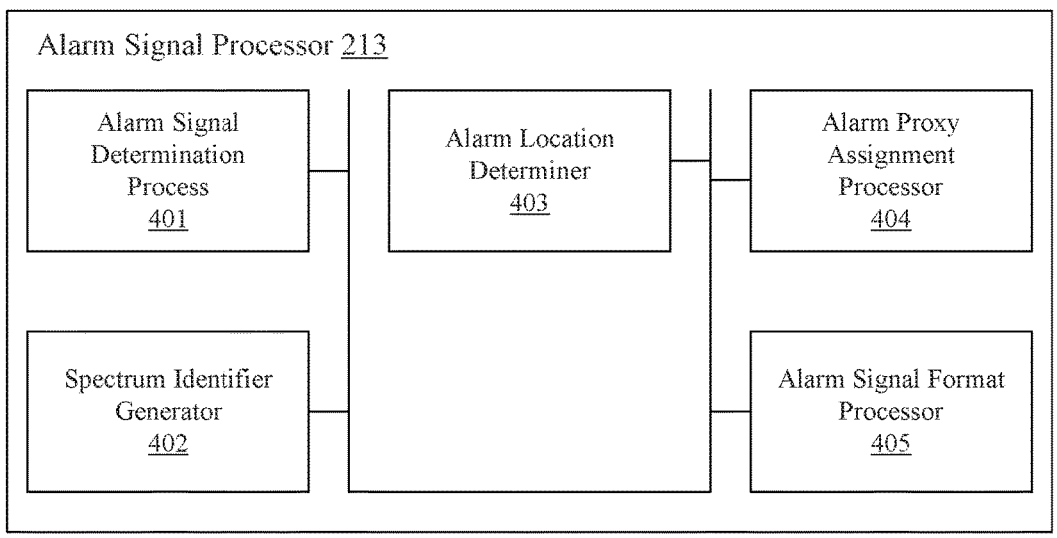
FIG. 4 illustrates exemplary components of alarm signal processor for spectrum access from FIG. 2, in accordance with some embodiments.

FIG. 4 illustrates exemplary components of alarm signal processor for spectrum access from FIG. 2, in accordance with some embodiments. FIG. 4 shows Alarm Signal Determination Process 401, Spectrum Identifier Generator 402, Alarm Location Determiner 403, Alarm Proxy Assignment Generator 404, and Alarm Signal Format Processor 405.

Alarm Signal Determination Process 401 interacts with the ELM Process and with the FSMS through the Spectrum Acquisition Manager in the Secure SAS to determine when there is an Incumbent System present and in which frequency band at which location.

Based on the calculations at 401, Spectrum Identifier Generator 402 determines which spectrum needs to be cleared and generates a message that reflects the frequency and bandwidth of the impacted spectrum. The message generated could have many formats including an IP layer message, a protocol layer message, or a physical layer signal that carries this information, or any other known way to signal information.

Alarm Location Determiner 403 works with 401 and 402 to determine where the spectrum needs to be cleared. Alarm Location Determiner 403 uses knowledge of which spectrum resource is allocated to which infrastructure node that lies in in the geographically determined location, in order to translate or map the impacted geographical location to Infrastructure Nodes or UEs that need to be signaled to silence their transmissions in the impacted spectrum resource.

If the Alarm Signal is sent by proxy, Alarm Proxy Assignment Generator 404 works with 401, 402, and 403 to determine which Infrastructure Node and/or UE needs to send the Alarm signal in order to silence the appropriate systems impacted spectrum resource.

Alarm Signal Format Processor 405 combines information from 401, 402, 403, and 404 to determine what format in which to send the alarm, and then to format the Alarm Signal to be transmitted in that manner.

Figure 10:
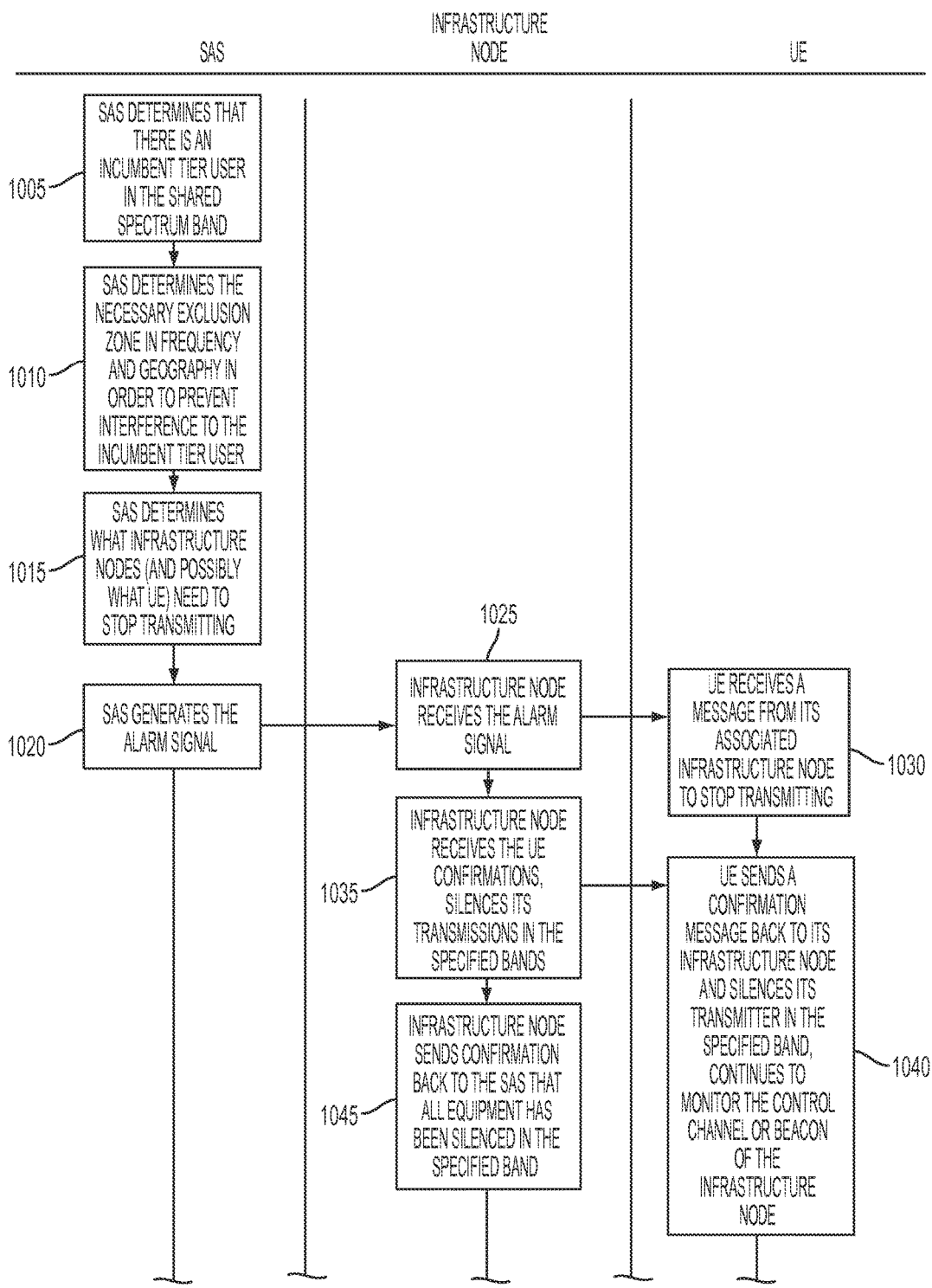
FIG. 10 illustrates an exemplary alarm signal use case for spectrum access, in accordance with some embodiments.
Figure 10:
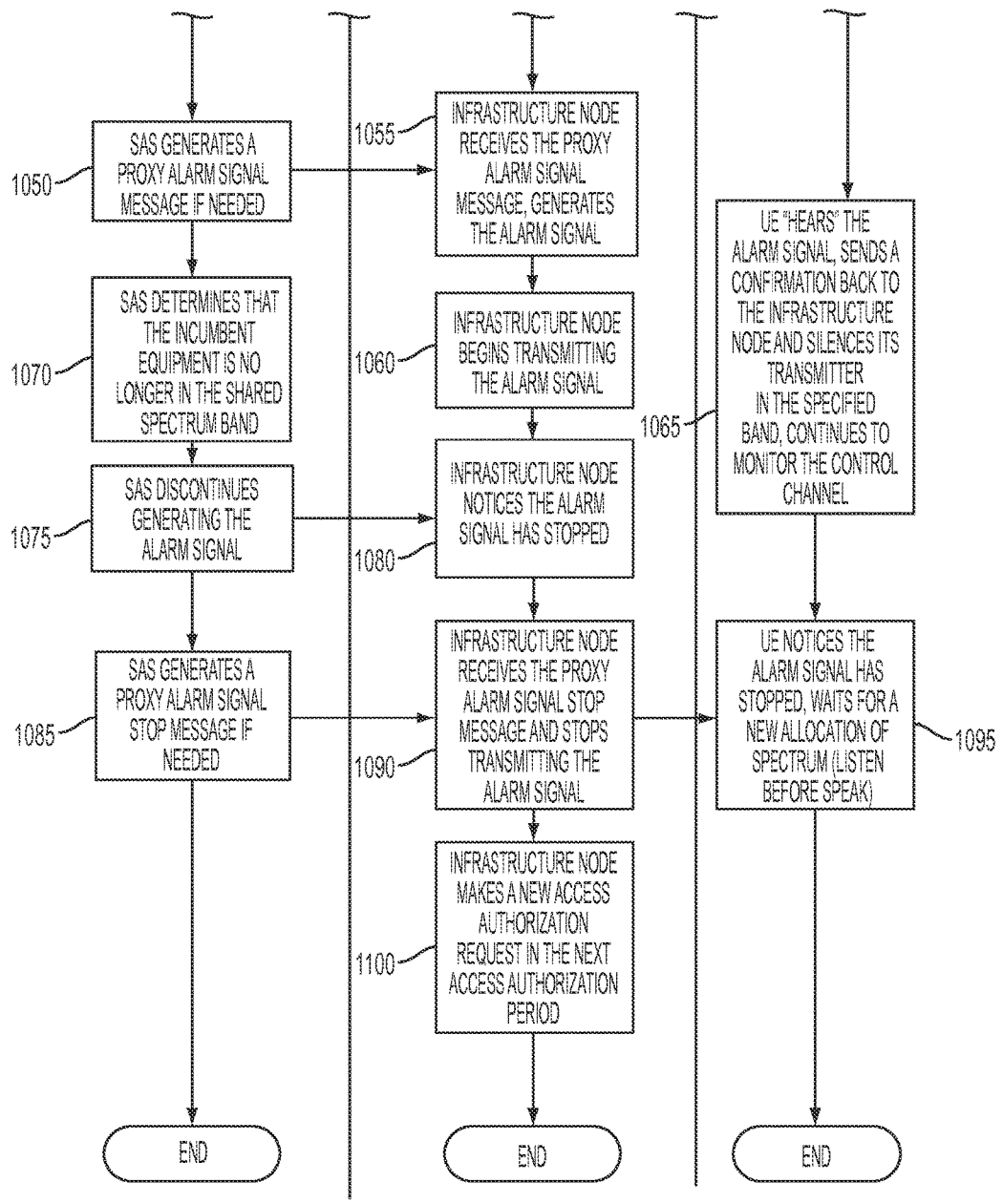

FIG. 10 illustrates an exemplary alarm signal use case for spectrum access, in accordance with some embodiments.

In step 1005, the SAS determines that there is an Incumbent Tier User in the shared spectrum band. In step 1010, the SAS determines the necessary exclusion zone in frequency and geography in order to prevent interference to the incumbent tier user. In step 1015, the SAS determines what Infrastructure Nodes (and possibly what UE) need to stop transmitting. In step 1020, the SAS generated an Alarm Signal. In step 1025, the Infrastructure Node receives the Alarm Signal. In step 1030, the UE receives a message from its associated Infrastructure Node to stop transmitting. In step 1035, the Infrastructure Node receives the UE confirmations and silences its transmissions in the specified bands.

In step 1040, the UE sends a confirmation message back to its Infrastructure Node and silences its transmitter in the specified band, and continues to monitor the control channel or beacon of the Infrastructure Node. In step 1045, the Infrastructure Note sends confirmation back to the SAS that all the equipment has been silenced in the specified band. In step 1050, the SAS generates a Proxy Alarm Signal message if needed. In step 1055, the Infrastructure Nodes receives the Proxy Alarm Signal message and generates the Alarm Signal.

In step 1060, the Infrastructure Node begins transmitting the Alarm Signal. In step 1065, the UE "hears" the Alarm Signal, sends a confirmation back to the Infrastructure Node, silences its transmitter in the specified band and continues to monitor the control channel. In step 1070, the SAS determines that the incumbent equipment is no longer in the shared spectrum band. In step 1075, the SAS discontinues generating the Alarm Signal. In step 1080, the Infrastructure Node notices the Alarm Signal has stopped.

In step 1085, the SAS generates a Proxy Alarm Signal stop message if needed. In step 1090, the Infrastructure Node receives the Proxy Alarm Signal stop message and stops transmitting the Alarm Signal. In step 1095, the UE notices the Alarm Signal has stopped and waits for a new allocation spectrum (listening before speaking) In step 1100, the Infrastructure Node makes a new Access Authorization Request in the next Access Authorization Period.

GAA Access to Unused Priority Access Bandwidth

Under the Revised Framework, when Priority Access rights have not been issued (e.g. due to lack of demand) or the spectrum is not actually in use by a Priority Access licensee, the SAS would automatically make that spectrum available for GAA use locally. This approach would ensure that the greatest possible portion of the 3.5 GHz Band would be intensively used.

Successful Priority Access Authorization for a spectrum resource within a Priority PAL gives the successful PAL Infrastructure Node the right to use the spectrum resource with priority over any other user. There is a risk that an Entity with significant market power may bid for, pay for, and be granted Priority Access rights for significant tracts of Priority Access License units in order to prevent other Entities from having access to them. To mitigate this risk, a PAL Infrastructure Node that has obtained Priority Access rights to use a given spectrum resource has an obligation to actually use this spectrum resource; if the bandwidth is unused then this spectrum resource should be provided to the GAA Tier, as described in the Revised Framework core concepts. This requirement serves the public interest by preventing Entities who have significant market power from excluding other smaller Entities, which would compromise the principle of Open Eligibility for Priority Access tier use.

If the PAL Infrastructure Node that has been granted Priority Access to a spectrum resource does not occupy the spectrum resource within a reasonable amount of time after the start of the Access Authorization Period, then the SAS may make this spectrum resource available to another user. This other user could be part of a different Priority Access Entity (perhaps another PAL Infrastructure Node that bid for the spectrum resource but was not successful) or it could be a GAA Infrastructure Node.

The likelihood that the 3.5 GHz band can include significant small cell deployment makes the task of verification of usage of PAL infrastructure devices configured as small cells potentially onerous, particularly if SAS must interact via incumbent Operations and Support Systems (OSS) with the associated panoply of legal constraints regarding, among other things, requirements for permission from end spectrum users to disclose their physical location. The universal Spectrum Sensing Specification for one or more Infrastructure Nodes and UE that plan to operate in federal shared spectrum can be utilized in order to determine whether a Priority Access spectrum resource is actually being used by the PAL Infrastructure Node that achieved Priority Access Authorization. If, for example, after one minute into the Access Authorization Period, the SAS determines through aggregated ELM information that Priority Access spectrum resources are not being used and verifies this information through real time accounting streaming data, the SAS may announce this spectrum to other Infrastructure Nodes on a GAA basis (whether it is a PAL Infrastructure Node or a GAA Infrastructure Node), thereby providing Authorization Access to that Infrastructure Node when the spectrum is not being used by the Priority Access Authorized node.

Physical tap measurements and aggregation on individual Infrastructure nodes to measure spectrum utilization will not likely scale up to the anticipated quantities and densities of PAL Infrastructure Nodes due to the expectation of significant small cells use in the 3.5 GHz band, and this therefore becomes impractical in the envisioned ecosystem. However, the Commission can make rules that require PAL Infrastructure Nodes and GAA Infrastructure Nodes to have Application Programming Interfaces (APIs) on each small cell or access point that can be provided to the SAS in order to determine in real time what bandwidth in what specific location might be available for use by the GAA Tier.

Precise real time accounting streaming data can be required from Infrastructure Nodes, and can be collected and aggregated by the SAS. Based on this information, the SAS could determine what licensed Priority Access Spectrum is not being currently used, and could announce this available spectrum resource to the GAA Tier such that GAA Infrastructure Nodes could make an Access Authorization request to use it. A hybrid approach which combines spectrum sensing with real time accounting streaming data is also possible.

If the Priority Access Authorized PAL Infrastructure Node which had acquired the spectrum use rights subsequently turns on and begins to use the spectrum resources that they purchased within the same Authorization Access Period, then the SAS can immediately order any GAA Infrastructure Node to stop using the spectrum resource immediately, thereby preserving the Priority Access for the successful PAL Infrastructure Node.

Security: Obfuscation, Anonymization, and the Secure SAS

In some embodiments, steps may be taken to ensure that Incumbent Tier user information is protected through obfuscation and anonymizing techniques. Additionally, any spectrum sensing or accounting information can be sufficiently aggregated and anonymized such that it cannot be used to identify Incumbent Tier users, compromising federal operations or National Security. In some embodiments, there may be a concern about the SAS susceptibility to probing attacks.

In some embodiments, the registration record of each Entity and Equipment in the PAD can provide the SAS a direct way to check that the credentials of a PAL Infrastructure Node making a Priority Application or a Priority Access Request matches the corresponding Entity credentials in the PAD. In addition, requests for spectrum usage can be required from a given PAL to be provided directly to the SAS from the PAL or GAA Infrastructure Node seeking that usage. In alternative license models not having the technical requirement that PAL and GAA Infrastructure Nodes use sCash to request spectrum directly from the SAS, an Entity known to the SAS may probe the SAS for the availability of spectrum, resulting in operationally unacceptable aggregation of information. In order for a malicious agent to effectively mount a probing attack against a specific federal user, the entity would have to acquire PAL or GAA Infrastructure Nodes, register them with the PAD, and cause them to interact directly with the SAS with monetary consequences. Although false information might be provided via a less secure PAD, there can be a high level of due diligence regarding PAD credentialing for Entities, and PAL and GAA Infrastructure Nodes.

Specifically, some embodiments would include the use of public key infrastructure (PKI) for the registration of such Entities and Infrastructure Nodes with PKI requirements phasing in, over time, with sCash, according to the balancing of divergent needs of commercial and federal aspects of shared spectrum.

Rules that require a direct interface between PAL Infrastructure Nodes and GAA Infrastructure Nodes and the SAS enable a wide range of measures for operational obfuscation of federal use of shared spectrum. These methods include a level of randomized denial of spectrum access requested by PAL or GAA Infrastructure Nodes. In addition, the definition of an Alarm Signal from the SAS itself limits the exposure of technical features of federal signals (e.g. there need be no "federal signal detector" in any 3550 MHz capable device), and the initiation of the Alarm Signal from the SAS can be a tool used in operational obfuscation. Generation of the Alarm Signal by federal devices also may provide further operational obfuscation initiated by a particular federal entity without recourse to SAS per se, allowing a distributed operation that is scalable and that allows independency of action of each of the federal agencies. Such obfuscation can be necessary to protect the operations of federal users while denying malicious agents knowledge of the capabilities and limitations of such federal radio devices, networks, and related capabilities, which is essential to public safety and National Defense. In some embodiments, a Secure SAS core can be created, employing Defense in Depth techniques. The outer layer of the SAS would interact with devices based on data that is in the outer layer. This data may have been manipulated by inner layers of the SAS in order to protect confidential information. The next layer in controls the database that the outer layer of the SAS is using (the PAD). The inner layer communicates with the outer layer Secure IP, for example using VPN or IPSec or PKI.

The core is the Secure SAS. This is the part of the SAS that interacts with the federal agencies and the Federal Spectrum Management System. The Secure SAS is trusted with respect to federal users. People who interact with and operate the Secure SAS would need security clearance.

Simple obfuscations, anonymization, and other known techniques which are in the public domain may be relevant but are not sufficient, and having a Secure Core in the SAS can be necessary to protect the public interest.

Sample JSON Message Formats

FIG. 11 illustrates fields in a Registration Record in the PAD related to Entity Classes, in accordance with some embodiments. FIG. 12 illustrates a bandwidth authorization request, in accordance with some embodiments. FIG. 13 illustrates a structure for a response message, in accordance with some embodiments. FIG. 14 illustrates a bandwidth authorization response, in accordance with some embodiments. FIG. 15 illustrates a bandwidth authorization response, in accordance with some embodiments. FIG. 16 illustrates a bandwidth continuation request, in accordance with some embodiments.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

In some embodiments, the computing devices can include user equipment. The user equipment can communicate with one or more radio access networks and with wired communication networks. The user equipment can be a cellular phone. The user equipment can also be a smart phone providing services such as word processing, web browsing, gaming, e-book capabilities, an operating system, and a full keyboard. The user equipment can also be a tablet computer providing network access and most of the services provided by a smart phone. The user equipment operates using an operating system such as Symbian OS, iPhone OS, RIMs Blackberry, Windows Mobile, Linux, HP WebOS, and Android. The screen might be a touch screen that is used to input data to the mobile device, in which case the screen can be used instead of the full keyboard. The user equipment can also keep global positioning coordinates, profile information, or other location information.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A computerized method for controlling access to shared spectrum, the method comprising:
   managing, by a spectrum access system, a set of priority classes of devices to use the shared spectrum, wherein the set of priority classes of devices comprise a network entity or a network infrastructure node, and wherein each priority class from the set of priority classes has different access rights to the shared spectrum, the set of priority classes comprising:
      a first priority class that has a top priority to use the shared spectrum over remaining priority classes in the set of priority classes, and the spectrum access system limits access for one or more devices associated with the remaining priority classes from using the shared spectrum while first priority devices use the shared spectrum; and
      a second priority class that has a priority below the first priority class;
   receiving, by the spectrum access system, a registration request from a device associated with the second priority class to use shared spectrum managed by the spectrum access system;
   creating, by the spectrum access system, a registration record for the device associated with the second priority class based on the registration request, and storing the registration record in a priority access database to register the device with the spectrum access system;
   receiving, by the spectrum access system, an application from the device associated with the second priority class, wherein the application comprises a request for permission to make future requests to the spectrum access system;
   updating, by the spectrum access system, the registration record for the device associated with the second priority class so that the device associated with the second priority class can make requests to use a bandwidth of the shared spectrum during a use period;
   receiving, by the spectrum access system, an access authorization request from one or more devices, wherein the access authorization request comprises a request to use a bandwidth of the shared spectrum during the use period, wherein the bandwidth is determined by aggregating spectrum needs of one or more user equipment associated with the one or more devices;

verifying, by the spectrum access system, the application received from the one or more devices to check an eligibility of the received access authorization request;

managing, by the spectrum access system, a decision making process between the one or more devices, the decision making process utilizing information in access authorization requests from each requesting device to decide whether to grant each of the one or more devices access to the shared spectrum; and granting, by the spectrum access system, rights to one or more of the requesting devices, to use the bandwidth of the shared spectrum during the requested use period based on the decision making process.

2. The method of claim 1, wherein the second priority class of devices contend with other devices for use of the shared spectrum based on a bid, so that devices valuing access more, as indicated by their bid, are more likely to be granted access to the shared spectrum network than devices valuing access less.

3. The method of claim 1, further comprising receiving the application from the device during an application period during which devices associated with the second priority class can apply with the spectrum access system for permission to contend with other devices from the second priority class for access to the shared spectrum.

4. The method of claim 1, wherein the set of priority classes further comprises a third priority class that has a priority below the second priority class for using the shared spectrum.

5. The method of claim 4, wherein the set of priority classes further comprises a fourth priority class that has a priority below the third priority class for using the shared spectrum.

6. A computerized method for registering with a spectrum access system to use shared spectrum, the method comprising:

managing, by the spectrum access system, a set of priority classes of devices to use the shared spectrum, wherein the set of priority classes of devices comprise a network entity or a network infrastructure node, and wherein each priority class from the set of priority classes has different access rights to the shared spectrum, the set of priority classes comprising:
 a first priority class that has a top priority to use the shared spectrum over remaining priority classes in the set of priority classes, and the spectrum access system limits one or more devices that are associated with the remaining priority classes from using the shared spectrum while first priority devices use the shared spectrum; and
 a second priority class that has a priority below the first priority class;

receiving, by the spectrum access system, a registration request from a device associated with the second priority class to use shared spectrum managed by the spectrum access system;

creating, by the spectrum access system, a registration record for the device associated with the second priority class based on the registration request, comprising:
 data indicative of a class for the device, wherein the class is used to group the device with other devices that comprise similar properties; and
 data indicative of legal information for the device, deployment information for the device, radio characteristics of the device, or any combination thereof; and storing, by the spectrum access system, the registration record in a priority access database in communication with the spectrum access system to register the device with the spectrum access system to contend with other devices in the second priority class to use the shared spectrum so that:
 the device can make an application to the spectrum access system, wherein the application comprises a request for permission to make future requests to the spectrum access system;
 the device can make an access authorization request to the spectrum access system to use a bandwidth of the shared spectrum, wherein the bandwidth is determined by aggregating spectrum needs of one or more user equipment associated with the device;

verifying, by the spectrum access system, the application received from the device to check an eligibility of the access authorization request; and granting, by the spectrum access system, rights to the device to use the bandwidth of the shared spectrum during a use period.

7. A computerized method for requesting permission from a spectrum access system to request priority use of shared spectrum managed by the spectrum access system, the method comprising:

managing, by the spectrum access system, a set of priority classes of devices to use the shared spectrum, wherein the set of priority classes of devices comprise a network entity or a network infrastructure node, and wherein each priority class from the set of priority classes has different access rights to the shared spectrum, the set of priority classes comprising:
 a first priority class that has a top priority to use the shared spectrum over remaining priority classes in the set of priority classes, and the spectrum access system limits access for one or more devices associated with the remaining priority classes from using the shared spectrum while first priority devices use the shared spectrum; and
 a second priority class that has a priority below the first priority class;

receiving, by the spectrum access system, an application from a device associated with the second priority class, wherein the application comprises a request for permission to make future requests to the spectrum access system, the application further comprising:

a set of priority application levels, wherein each priority application level comprises a frequency range and a geographic area; and a priority application fee for each priority application level in the set of priority application levels;

retrieving, by the spectrum access system, a registration record for the device in a priority access database in communication with the spectrum access system indicative of the device being registered with the spectrum access system to use shared spectrum;

approving, by the spectrum access system, one or more of the priority application levels from the set of priority application levels for the device based on the registration record; and transmitting, by the spectrum access system, a response to the device granting the device permission to request priority use of the approved one or more priority application levels, wherein the approval is valid during an application validity period; and updating, by the spectrum access system, the registration record for the device to include the approved one or more priority application levels so that the device request use of a bandwidth of the shared spectrum during the application validity period for the shared spectrum.

8. A computerized method for granting rights to a device to use a portion of shared spectrum managed by a spectrum access system, the method comprising:

managing, by a spectrum access server, a set of priority classes of devices to use the shared spectrum, wherein the set of priority classes of devices comprise a network entity or a network infrastructure node, and wherein each priority class from the set of priority classes has different access rights to the shared spectrum, the set of priority classes comprising:
  a first priority class that has a top priority to use the shared spectrum over remaining priority classes in the set of priority classes, and the spectrum access system limits access for one or more devices associated with the remaining priority classes from using the shared spectrum while first priority devices use the shared spectrum; and
  a second priority class that has a priority below the first priority class;

receiving, by the spectrum access system, an access authorization request from a device associated with the second priority class, wherein the access authorization request comprises:
  a request to use a bandwidth of the shared spectrum managed by the spectrum access system, wherein the bandwidth is determined by aggregating spectrum needs of one or more user equipment associated with the device; and
  a period during which the device intends to use the requested bandwidth of the shared spectrum;

verifying, by the spectrum access system, that a registration record for the device associated with the second priority class includes an approved priority application level associated with the requested bandwidth of the shared spectrum so that the device can request use of the requested bandwidth;

managing, by the spectrum access system, a decision making process for the requested bandwidth of the shared spectrum between one or more devices of the set of priority classes of devices, the decision making process utilizing information in access authorization requests from each requesting device associated with the second priority class; and granting, by the spectrum access system, rights to one or more of the requesting devices associated with the second priority class to use the requested bandwidth of the shared spectrum during the requested use period based on the decision making process.

9. The method of claim 8, wherein the device associated with the second priority class is the network infrastructure node, and the requested spectrum comprises spectrum for the network infrastructure node required to service a set of user equipment with the network infrastructure node.

10. A method for controlling access to a shared spectrum, the method comprising:

receiving a registration request for a first device;
using the registration request to register the first device with a spectrum access system;

receiving, after the first device has been registered with the spectrum access system, an application, wherein the application comprises a request for permission to make future requests to the spectrum access system;

receiving an access authorization request, wherein the access authorization request comprises a request for the first device to use at least a bandwidth of the shared spectrum, wherein the bandwidth is determined by aggregating spectrum needs of one or more user equipment associated with the first device;

verifying, by the spectrum access system, the application received from the first device to check an eligibility of the received access authorization request;

determining whether to grant the access authorization request for the first device based on at least one of the received access authorization request for the first device and one or more requests for other devices to use the shared spectrum requested in the access authorization request for the first device; and granting, based on the determination, rights to the first device to use at least the bandwidth of the shared spectrum requested in its access authorization request.

11. The method of claim 10, wherein the spectrum access system manages shared spectrum for devices associated with at least first and second priority classes and the first device is a second priority class device, wherein the first priority class devices have higher priority access to the shared spectrum than the second priority class devices.

12. The method of claim 10, wherein the application for permission for the first device is received during an application period.

13. The method of claim 10, wherein the application for permission for the first device includes at least:
  a set of priority application levels, wherein each priority application level comprises a frequency range and a geographic area; and
  a priority application fee for each priority application level in the set of priority application levels.

14. A system for controlling access to a shared spectrum, the system comprising:
  at least one memory configured to store instructions for execution by a processor; and
  at least one processor configured to execute the instructions to:
    receive a registration request for a first device;
    use the registration request to register the first device with a spectrum access system;
    receive, after the first device has been registered with the spectrum access system, an application, wherein the application comprises a request for permission for the first device to make future requests to the spectrum access system;
    receive, after receiving the application for permission for the first device, an access authorization request, wherein the access authorization request comprises a request to use at least a bandwidth of the shared spectrum corresponding to the application for permission, wherein the bandwidth is determined by aggregating spectrum needs of one or more user equipment associated with the first device;
    verify, by the spectrum access system, the application received from the first device to check an eligibility of the received access authorization request;
    determine whether to grant the access authorization request for the first device based on at least one of the received access authorization request for the first device and one or more requests for other devices to use the shared spectrum requested in the access authorization request for the first device;

grant, based on the determination, rights to the first device to use at least the bandwidth of the shared spectrum requested in its access authorization request.

15. The system of claim 14, wherein the spectrum access system manages shared spectrum for devices associated with at least first and second priority classes and the first device is a second priority class device, wherein the first priority class devices have higher priority access to the shared spectrum than the second priority class devices.

16. The system of claim 14, wherein the application for permission for the first device is received during an application period.

17. The system of claim 14, wherein the application for permission for the first device includes at least:

a set of priority application levels, wherein each priority application level comprises a frequency range and a geographic area; and a priority application fee for each priority application level in the set of priority application levels.

* * * * *